US011162641B2

United States Patent
Thomas et al.

(10) Patent No.: US 11,162,641 B2
(45) Date of Patent: Nov. 2, 2021

(54) LOW EMISSION NOZZLES AND RECEPTACLES

(71) Applicant: Engineered Controls International, LLC, Elon, NC (US)

(72) Inventors: Chad Thomas, Summerfield, NC (US); Howard M. Konishi, Redmond, WA (US); Jeffrey S. Howard, Elon, NC (US)

(73) Assignee: Engineered Controls International, Elon, NC (US)

( * ) Notice: Subject to any disclaimer, the term of this patent is extended or adjusted under 35 U.S.C. 154(b) by 0 days.

(21) Appl. No.: 17/109,940

(22) Filed: Dec. 2, 2020

(65) Prior Publication Data

US 2021/0088187 A1 Mar. 25, 2021

Related U.S. Application Data

(63) Continuation of application No. 16/538,534, filed on Aug. 12, 2019, now Pat. No. 10,883,665, which is a (Continued)

(51) Int. Cl.
*F17C 13/04* (2006.01)
*F17C 6/00* (2006.01)
(Continued)

(52) U.S. Cl.
CPC ............ *F17C 13/04* (2013.01); *F16K 15/026* (2013.01); *F17C 5/02* (2013.01); *F17C 5/06* (2013.01); *F17C 6/00* (2013.01); *F17C 9/00* (2013.01); *F17C 2205/037* (2013.01); *F17C 2205/0326* (2013.01); *F17C 2205/0329* (2013.01);
(Continued)

(58) Field of Classification Search
CPC .... F17C 13/04; F17C 6/00; F17C 9/00; F17C 5/02; F17C 5/06; F16K 15/026
See application file for complete search history.

(56) References Cited

U.S. PATENT DOCUMENTS

| 430,721 A | 6/1890 | Winkler |
| 1,959,258 A | 5/1932 | Zerk |

(Continued)

FOREIGN PATENT DOCUMENTS

| CA | 2166844 | 7/1996 |
| CN | 1039890 | 2/1990 |

(Continued)

OTHER PUBLICATIONS

International Search Report and Written Opinion for PCT/US2016/064810 dated Mar. 8, 2017.
(Continued)

*Primary Examiner* — Timothy L Maust
*Assistant Examiner* — James R Hakomaki
(74) *Attorney, Agent, or Firm* — Neal, Gerber & Eisenberg LLP

(57) ABSTRACT

A nozzle for dispensing fluid includes a probe slidably disposed in a main body. The probe has a probe body defining a check sealing surface and a check void. A check assembly is at least partially disposed in the check void, and includes a check configured to move relative to the main body and the probe body. A spring is configured to bias the check to sealingly engage the check against the check sealing surface of the probe body.

24 Claims, 21 Drawing Sheets

Related U.S. Application Data continuation of application No. 15/368,360, filed on Dec. 2, 2016, now Pat. No. 10,386,017.

(60) Provisional application No. 62/307,195, filed on Mar. 11, 2016, provisional application No. 62/262,749, filed on Dec. 3, 2015.

(51) Int. Cl.
 *F17C 9/00* (2006.01)
 *F16K 15/02* (2006.01)
 *F17C 5/02* (2006.01)
 *F17C 5/06* (2006.01)

(52) U.S. Cl.
 CPC  *F17C 2205/0335* (2013.01); *F17C 2221/033* (2013.01); *F17C 2221/035* (2013.01); *F17C 2223/0123* (2013.01); *F17C 2223/0153* (2013.01); *F17C 2223/0161* (2013.01); *F17C 2250/03* (2013.01); *F17C 2250/0443* (2013.01); *F17C 2250/0478* (2013.01); *F17C 2260/02* (2013.01); *F17C 2260/036* (2013.01); *F17C 2260/04* (2013.01)

(56) References Cited

U.S. PATENT DOCUMENTS

| | | |
|---|---|---|
| 2,070,013 A | 2/1937 | Krannak |
| 2,210,823 A | 8/1940 | Victor et al. |
| 2,259,137 A | 10/1941 | Iftiger, Sr. |
| 2,323,099 A | 6/1943 | Patten |
| 2,327,714 A | 8/1943 | Iftiger, Sr. |
| 2,388,179 A | 10/1945 | Prowd |
| 2,434,167 A | 1/1948 | Knobblauch |
| 2,512,320 A | 6/1950 | Fischer |
| 2,552,543 A | 5/1951 | Earle et al. |
| 2,675,829 A | 4/1954 | Livers |
| 2,797,110 A | 6/1957 | Covington |
| 2,904,351 A | 9/1959 | Gellett et al. |
| 3,069,127 A | 12/1962 | Perry et al. |
| 3,474,827 A | 10/1969 | Rosell |
| 3,583,667 A | 6/1971 | Amneus, Jr. |
| 3,589,673 A | 6/1971 | Cruse |
| 3,612,551 A | 10/1971 | Grabill, Jr. |
| 3,674,051 A | 7/1972 | Stratman |
| 3,680,591 A | 8/1972 | Vik |
| 3,710,823 A | 1/1973 | Vik |
| 3,757,836 A | 9/1973 | Masuda |
| 3,809,122 A | 5/1974 | Berg |
| 3,897,091 A | 7/1975 | McMath et al. |
| 3,913,844 A | 10/1975 | Petrovic |
| 3,924,654 A | 12/1975 | Buller et al. |
| 4,124,228 A | 11/1978 | Morrison |
| 4,181,150 A | 1/1980 | Maldavs |
| 4,234,161 A | 11/1980 | Wilder et al. |
| 4,303,098 A | 12/1981 | Shindelar |
| 4,347,870 A | 9/1982 | Maldavs |
| 4,366,945 A | 1/1983 | Blauenstein |
| 4,398,561 A | 8/1983 | Maldavs |
| 4,437,647 A | 3/1984 | Cruse |
| 4,541,457 A | 9/1985 | Blenkush |
| 4,543,995 A | 10/1985 | Weh et al. |
| 4,552,333 A | 11/1985 | Niemi |
| 4,676,269 A | 6/1987 | Sarson |
| 4,709,726 A | 12/1987 | Fitzgibbons |
| 4,716,938 A | 1/1988 | Weh et al. |
| 4,726,390 A | 2/1988 | Franklin |
| 4,799,512 A | 1/1989 | Sarson |
| 4,881,573 A | 11/1989 | Durant et al. |
| 4,884,830 A | 12/1989 | Meisinger |
| 4,921,282 A | 5/1990 | Meisinger |
| 5,002,254 A | 3/1991 | Belisaire et al. |
| 5,046,523 A | 9/1991 | Horhota |
| 5,074,332 A | 12/1991 | Jones |
| 5,080,132 A | 1/1992 | Manz et al. |
| 5,092,364 A | 3/1992 | Mullins |
| 5,127,428 A | 7/1992 | Fahl |
| 5,129,621 A | 7/1992 | Maiville et al. |
| 5,139,049 A | 8/1992 | Jensen et al. |
| 5,161,568 A | 11/1992 | Turvey |
| 5,205,317 A | 4/1993 | Neuerberg et al. |
| 5,211,197 A | 5/1993 | Marrison et al. |
| 5,255,714 A | 10/1993 | Mullins |
| 5,265,844 A | 11/1993 | Westfall |
| 5,289,850 A | 3/1994 | Sarson et al. |
| 5,290,009 A | 3/1994 | Heilmann |
| 5,293,902 A | 3/1994 | Lapierie |
| 5,301,723 A | 4/1994 | Goode |
| 5,339,862 A | 8/1994 | Haunhorst |
| 5,363,879 A | 11/1994 | Rhoades |
| 5,413,309 A | 5/1995 | Giesler |
| 5,429,155 A | 7/1995 | Brzyski et al. |
| 5,439,258 A | 8/1995 | Yates |
| 5,445,358 A | 8/1995 | Anderson |
| 5,507,530 A | 4/1996 | Mahaney |
| 5,535,985 A | 7/1996 | Larbuisson |
| 5,547,166 A | 8/1996 | Engdahl |
| 5,564,471 A | 10/1996 | Wilder et al. |
| 5,575,510 A | 11/1996 | Weh et al. |
| 5,577,706 A | 11/1996 | King |
| 5,580,099 A | 12/1996 | Eaton |
| 5,603,353 A | 2/1997 | Clark et al. |
| 5,630,570 A | 5/1997 | Lacroix et al. |
| 5,649,723 A | 7/1997 | Larsson |
| 5,671,777 A | 9/1997 | Allen et al. |
| 5,706,967 A | 1/1998 | Weh et al. |
| 5,709,243 A | 1/1998 | Wells et al. |
| 5,788,443 A | 8/1998 | Cabahug |
| 5,806,832 A | 9/1998 | Larbuisson |
| 5,829,480 A | 11/1998 | Smith, III |
| 5,884,648 A | 3/1999 | Savage |
| 5,896,889 A | 4/1999 | Menard |
| 5,927,683 A | 7/1999 | Weh et al. |
| 5,937,885 A | 8/1999 | Sampson |
| 5,950,679 A | 9/1999 | Danielson et al. |
| 5,967,491 A | 10/1999 | Magnuson et al. |
| 5,984,265 A | 11/1999 | Engdahl |
| 5,988,697 A | 11/1999 | Arosio |
| 6,035,894 A | 3/2000 | Weh et al. |
| 6,039,303 A | 3/2000 | Danielson et al. |
| 6,056,010 A | 5/2000 | Wells |
| 6,073,971 A | 6/2000 | Weh et al. |
| 6,073,974 A | 6/2000 | Meisinger et al. |
| 6,082,399 A | 7/2000 | Nyberg |
| 6,148,858 A | 11/2000 | Kirkman |
| 6,152,496 A | 11/2000 | Kouda |
| 6,155,294 A | 12/2000 | Comford et al. |
| 6,161,578 A | 12/2000 | Braun et al. |
| 6,202,691 B1 | 3/2001 | Smith, III |
| 6,202,692 B1 | 3/2001 | Schumacher |
| 6,257,278 B1 | 7/2001 | Danielson et al. |
| 6,279,874 B1 | 8/2001 | Nyberg |
| 6,343,630 B1 | 2/2002 | Dubinsky |
| 6,375,152 B1 | 4/2002 | Weh et al. |
| 6,382,251 B1 | 5/2002 | Hopson |
| 6,398,268 B1 | 6/2002 | Takahashi et al. |
| 6,408,880 B1 | 6/2002 | Kaul |
| 6,412,828 B1 | 7/2002 | Lacroix et al. |
| 6,499,719 B1 | 12/2002 | Clancy et al. |
| 6,511,100 B1 | 1/2003 | Le Clinche |
| 6,637,460 B2 | 10/2003 | Haunhorst |
| 6,705,550 B2 | 3/2004 | Bell |
| 6,776,187 B1 | 8/2004 | Marquis et al. |
| 6,830,070 B2 | 12/2004 | Mikiya et al. |
| 6,840,276 B2 | 1/2005 | Zeiber et al. |
| 6,840,548 B2 | 1/2005 | Lacroix |
| 6,945,477 B2 | 9/2005 | Lambert et al. |
| 7,040,358 B2 | 5/2006 | Lacroix et al. |
| 7,073,773 B2 | 7/2006 | Nuttall et al. |
| 7,469,718 B2 | 12/2008 | Lambert et al. |
| 7,497,231 B2 | 3/2009 | Sasa |
| 7,568,737 B2 | 8/2009 | Wells et al. |
| 7,753,415 B2 | 7/2010 | Tiberghien et al. |

(56) References Cited

U.S. PATENT DOCUMENTS

| | | |
|---|---|---|
| 7,841,580 B2 | 11/2010 | Konishi et al. |
| 7,922,214 B2 | 4/2011 | Nakamura et al. |
| 7,959,159 B2 | 6/2011 | Hocker et al. |
| 8,056,581 B2 | 11/2011 | Danielson et al. |
| 8,113,240 B2 | 2/2012 | Blanchard et al. |
| 9,115,838 B2 | 8/2015 | Konishi |
| 9,534,720 B2 | 1/2017 | Reasoner |
| 9,732,893 B2 | 8/2017 | Konishi |
| 9,783,406 B2 | 10/2017 | Torngren |
| 9,897,239 B2 | 2/2018 | Konishi |
| 9,969,605 B2 | 5/2018 | Geipel et al. |
| 2003/0085574 A1 | 5/2003 | Froment et al. |
| 2004/0094956 A1 | 5/2004 | Lacroix et al. |
| 2007/0001143 A1 | 1/2007 | Konishi et al. |
| 2007/0235092 A1 | 10/2007 | Danielson et al. |
| 2008/0011369 A1 | 1/2008 | Matsumoto |
| 2008/0128034 A1 | 6/2008 | Fahl |
| 2008/0185837 A1 | 8/2008 | Danielson |
| 2008/0265574 A1 | 10/2008 | Tiberghien et al. |
| 2009/0140519 A1 | 6/2009 | Pavnaskar et al. |
| 2009/0165870 A1 | 7/2009 | Konishi |
| 2009/0205722 A1 | 8/2009 | Sledz |
| 2010/0024904 A1 | 2/2010 | Hoffman et al. |
| 2010/0127198 A1 | 5/2010 | Cozza |
| 2010/0148499 A1 | 6/2010 | Le Quere |
| 2011/0005639 A1 | 1/2011 | Weh et al. |
| 2011/0186176 A1 | 8/2011 | Aehle et al. |
| 2012/0280493 A1 | 11/2012 | Konishi |
| 2014/0261741 A1 | 9/2014 | Konishi |
| 2017/0146174 A1 | 5/2017 | Gennasio et al. |

FOREIGN PATENT DOCUMENTS

| | | |
|---|---|---|
| CN | 1135588 | 11/1996 |
| CN | 2293698 | 10/1998 |
| CN | 2578650 | 10/2003 |
| CN | 1502839 | 6/2004 |
| CN | 1608910 | 4/2005 |
| CN | 101061350 | 10/2007 |
| CN | 101946113 | 1/2011 |
| CN | 103547848 | 1/2014 |
| DE | 19882564 | 8/2000 |
| EP | 0039977 | 11/1981 |
| EP | 2689177 | 1/2014 |
| WO | WO1980001711 | 8/1980 |
| WO | WO1993025838 | 12/1993 |
| WO | WO2003095883 | 11/2003 |
| WO | WO2012129340 | 9/2012 |
| WO | WO2013059748 | 4/2013 |

OTHER PUBLICATIONS

Office Action for Chinese Patent Application No. 201680070652.X dated Nov. 9, 2019, 9 pp.

LOW EMISSION NOZZLES AND RECEPTACLES

PRIORITY CLAIM

The present application is a continuation of U.S. patent application Ser. No. 16/538,534, filed on Aug. 12, 2019, which is a continuation of U.S. patent application Ser. No. 15/368,360, now U.S. Pat. No. 10,386,017, filed on Dec. 2, 2016, which claims the benefit of U.S. Provisional App. No. 62/262,749, filed on Dec. 3, 2015, and U.S. Provisional App. No. 62/307,195, filed on Mar. 11, 2016. These prior applications are hereby incorporated by reference in their entireties.

TECHNICAL FIELD

The present application generally relates to nozzles configured to deliver pressurized fluid and receptacles configured to receive pressurized fluid.

BACKGROUND

Receptacles are designed to receive fluid from nozzles. Receptacles transfer the received fluid into a connected storage tank. One example of a receptacle is a car gasoline port. One example of a nozzle is a gasoline dispenser at a gas station. One example of a connected storage tank is a car gas tank. Some fluids, such as liquid natural gas (LNG), compressed natural gas (CNG), liquefied petroleum gas (LPG), among others, are transferred via specialized nozzles and receptacles.

LNG and LPG may be stored in liquid form at cryogenic temperatures (e.g., −150 degrees C. or −238 degrees F.). During the transferring process between nozzle and receptacle, a portion of LNG/LNG may heat up and vaporize into gas. This gas expands to occupy all accessible areas of the nozzle and receptacle. When the transferring process is complete, a portion of the vaporized gas will remain in the receptacle. When the nozzle is eventually disconnected from the receptacle, this remaining gas is often intentionally vented into ambient atmosphere.

CNG may be stored under high pressures. During the transferring process between nozzle and receptacle, CNG may expand and occupy all accessible areas of the nozzle and receptacle. When the transferring process is complete, a portion of the gas will remain in the receptacle. When the nozzle is eventually disconnected from the receptacle, this remaining gas is often intentionally vented into ambient atmosphere.

Even when the remaining gas is intentionally vented from the receptacle, new gas will flow from the storage tank into the receptacle, thus pressurizing the receptacle. The next time a nozzle is inserted into the receptacle, the remaining gas will oppose the insertion of the nozzle, thus making the coupling process physically difficult.

SUMMARY

Various embodiments of the present disclosure provide nozzles and receptacles, which (a) minimize the amount of fluid vented into atmosphere when the nozzles disconnect from the receptacles and/or (b) enable a low difficulty coupling process between the nozzles and the receptacles.

A nozzle consistent with the present disclosure may be configured to occupy a retracted position and an extended position. The nozzle may include: (a) a nozzle main body; (b) a nozzle probe comprising a nozzle flat annular surface and a nozzle check sealing surface, the nozzle probe defining a nozzle inner void, a nozzle check void, and one or more nozzle passageways leading from the nozzle inner void to the nozzle check void; (c) a nozzle check assembly disposed in the nozzle check void, the nozzle check assembly comprising a nozzle check and a nozzle spring, the nozzle spring biasing the nozzle check assembly to a closed position where the nozzle check sealingly engages the nozzle check sealing surface. When the nozzle check assembly is in the closed position, the nozzle check may longitudinally extend beyond the flat annular surface.

A receptacle consistent with the present disclosure may include: (a) a receptacle main body defining a receptacle main inner void; (b) a receptacle spring seat disposed in the receptacle main body, the receptacle spring seat defining a receptacle central void; (c) a receptacle stem at least partially disposed in the receptacle central void of the receptacle spring seat, the receptacle stem being at least partially disposed in the receptacle main inner void; (d) a receptacle poppet connected to the receptacle stem, the receptacle poppet comprising a receptacle inner check sealing surface and defining a receptacle central inner check void; (e) a receptacle spring disposed between the receptacle spring seat and the receptacle poppet, the receptacle spring at least partially occupying the receptacle main inner void, the receptacle spring biasing the receptacle poppet to a closed position; (f) a receptacle check assembly at least partially disposed in the receptacle inner check void, the receptacle check assembly comprising a receptacle check and a receptacle check spring, the receptacle check spring biasing the receptacle check toward a closed position where the receptacle check engages the receptacle inner check sealing surface, the receptacle check protruding from the poppet when the receptacle check is in the closed position.

A method consistent with the present disclosure may include: (a) equalizing pressure between the nozzle inner void and the receptacle main inner void by pressing the nozzle check against the receptacle check to open the nozzle check and the receptacle check; (b) extending the nozzle into the receptacle such that the receptacle main body surrounds at least a portion of the nozzle probe; (c) flowing fluid from the nozzle inner void into the receptacle main inner void.

BRIEF DESCRIPTION OF THE DRAWINGS

FIG. 4 is a cross-sectional plan view of a first step of the coupling sequence where a poppet of the receptacle is closed and center checks of the poppet and receptacle are touching and closed.

FIG. 5 is a cross-sectional plan view of a second step of the coupling sequence where the poppet of the receptacle is closed and one or both of the center checks are open.

FIG. 6 is a cross-sectional plan view of a third step of the coupling sequence where the poppet of the receptacle is in an open position and both of the center checks are open.

FIG. 7 is a cross-sectional plan view of a fourth step of the coupling sequence where the poppet of the receptacle is in a fully open position and both of the center checks are open.

FIG. 10 is a cross-sectional plan view of a first step of the coupling sequence.

FIG. 11 is a cross-sectional plan view of a second step of the coupling sequence.

FIG. 12 is a cross-sectional plan view of a third step of the coupling sequence.

DETAILED DESCRIPTION

Figure 1:
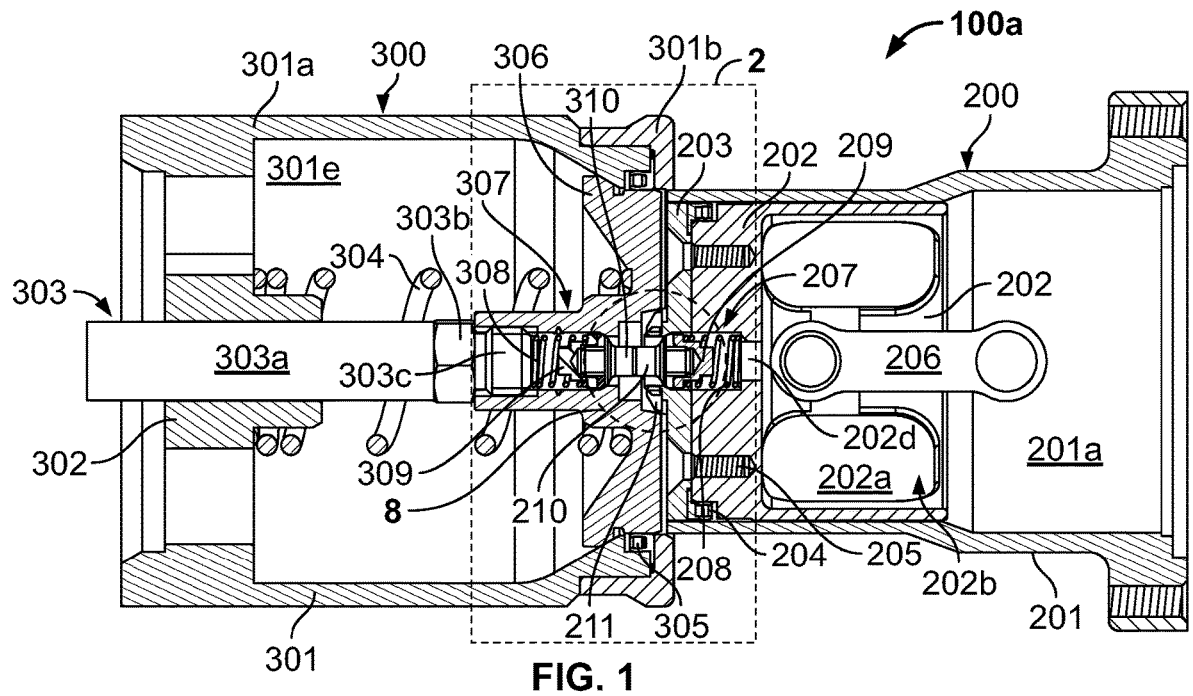
FIG. 1 is a cross-sectional plan view of a first nozzle partially coupled with a first receptacle.

The invention is defined by the appended claims. The description summarizes aspects of some disclosed embodiments and should not be used to limit the claims. Other embodiments are contemplated in accordance with the techniques described herein, as will be apparent upon examination of the following drawings and detailed description, and such embodiments are within the scope of this application.

For a better understanding of the disclosure, reference may be made to embodiments shown in the drawings. The components in the drawings are not necessarily to scale, and related elements may be omitted so as to emphasize and clearly illustrate the novel features described herein. In addition, system components can be variously arranged, as known in the art. In the figures, like referenced numerals may refer to like parts throughout the different figures unless otherwise specified.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components may be made without departing from the spirit or scope of the claims as set forth herein. This specification is intended to be taken as a whole and interpreted in accordance with the principles of the invention as taught herein and understood by one of ordinary skill in the art.

Some features may be described using relative terms such as top, bottom, vertical, rightward, leftward, etc. It should be appreciated that such relative terms are only for reference with respect to the appended Figures. These relative terms are not meant to limit the disclosed embodiments. More specifically, it is contemplated that the valves depicted in the appended Figures will be oriented in various directions in practice and that the relative orientation of features will change accordingly.

Figure 17:
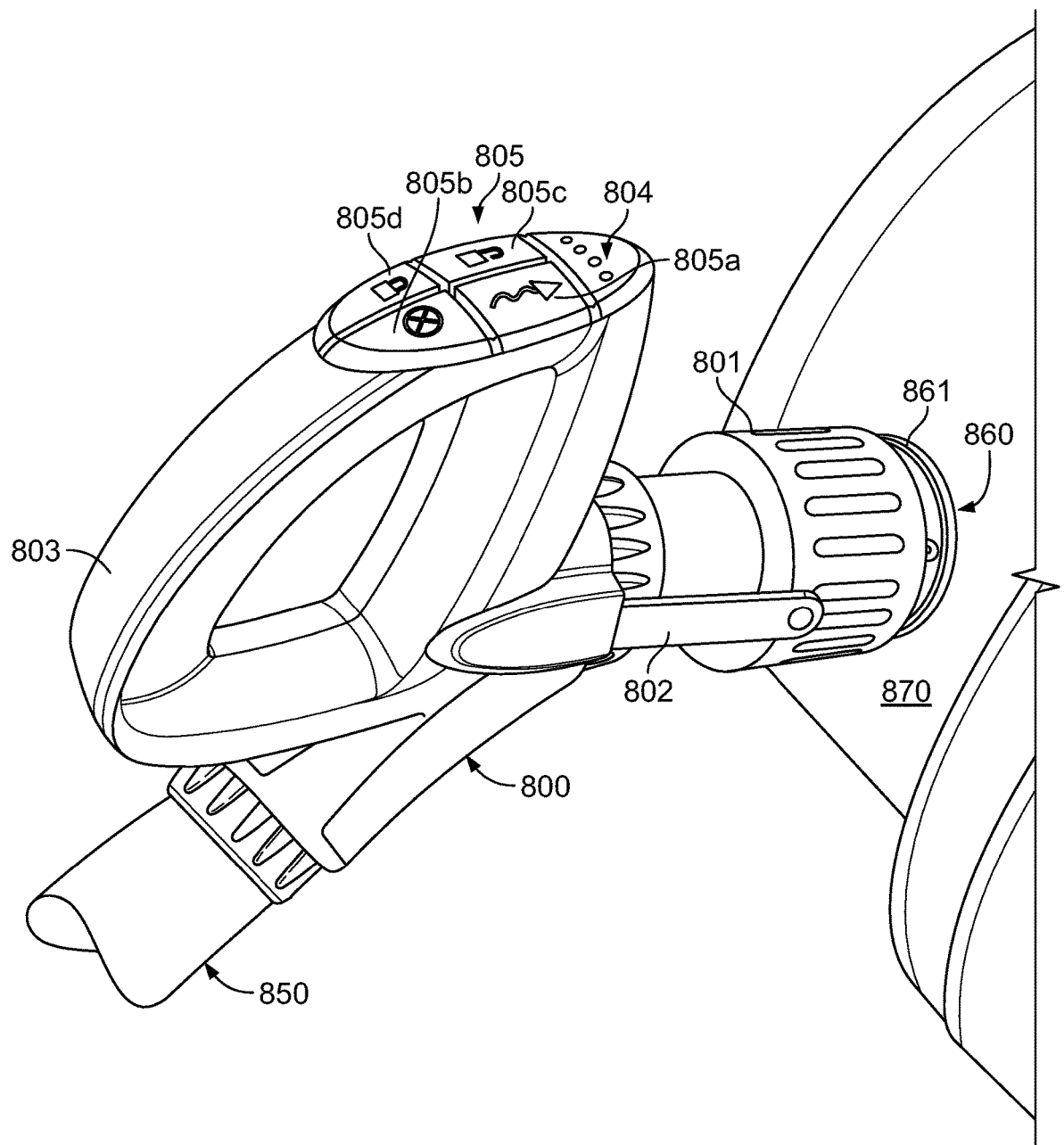
FIG. 17 is an isometric view of a nozzle having an electronic controller, both of which are integrated into a handle.

With reference to FIG. 17, a fluid source assembly may include (a) a source tank (not shown), (b) a nozzle 801 and (c) a hose or conduit 850 extending between the source tank and nozzle. One example of a fluid source assembly is a natural gas filling station. Similarly, a fluid destination assembly may include (a) a destination tank 870, (b) a receptacle 860, and (c) a hose or conduit (not shown) extending between the destination tank and receptacle. One example of a fluid destination assembly is a vehicle configured to store natural gas.

FIGS. 1 to 8 show first embodiments of a nozzle 200 and a receptacle 300. Nozzle 200 is configured to couple with and decouple from receptacle 300. Upon complete coupling between nozzle 200 and receptacle 300, fluid may flow from the source tank (not shown), through the source hose or conduit 850, through nozzle 200, through receptacle 300, through a destination hose or conduit (not shown), and into a destination tank 870.

Figure 7:
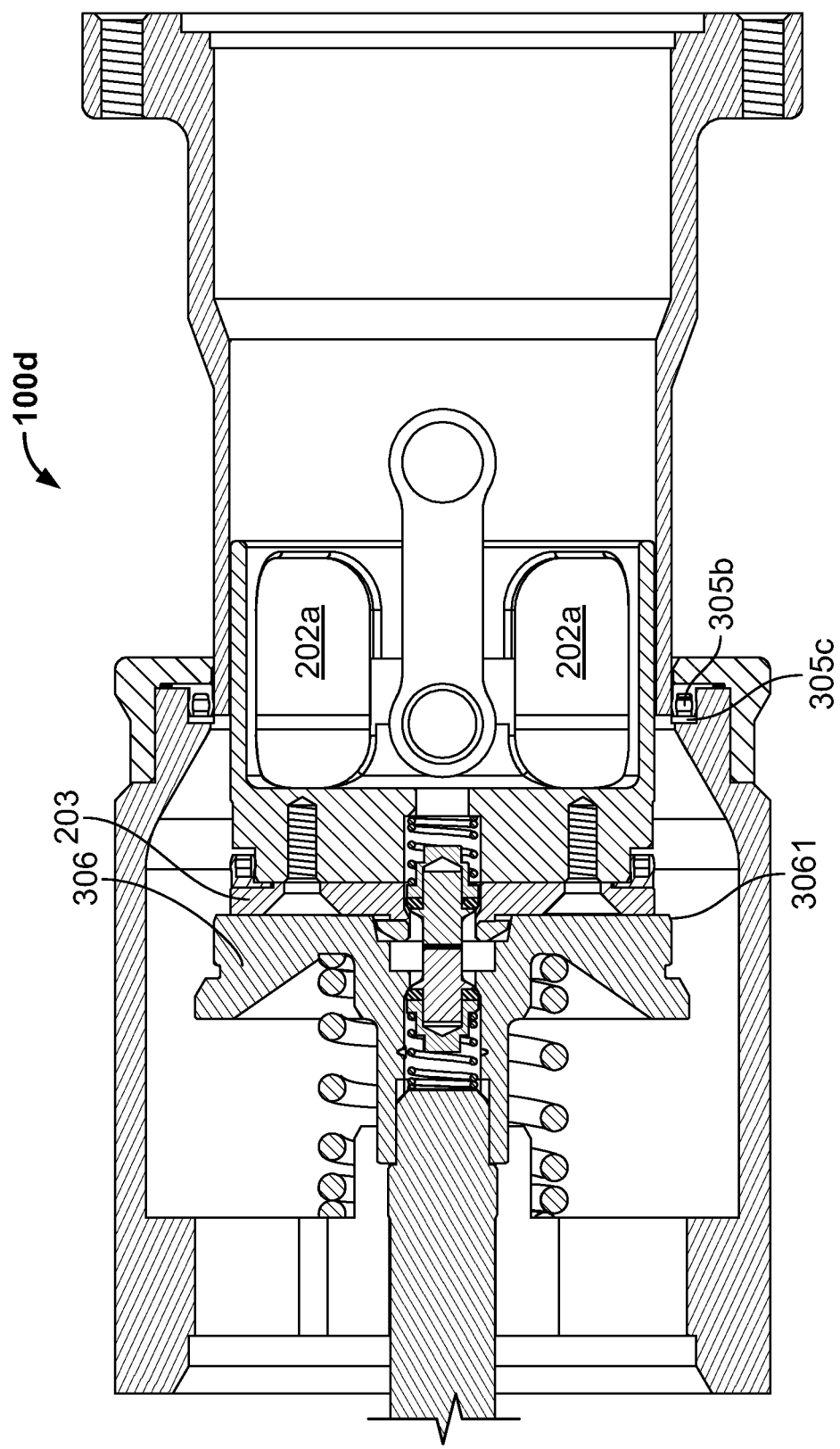

Nozzle 200 is configured to accept fluid from the source hose or conduit 850 via inlet void 201a and to expel the fluid into receptacle 300 through one or more outlet voids 202a (also called outlet ports). Inlet void 201a may be in constant fluid communication with outlet voids 202a, even prior to coupling between nozzle 200 and receptacle 300. In FIG. 1, fluid cannot access receptacle 300 via outlet voids 202a because nozzle 200 is only partially coupled with receptacle 300. In FIG. 7, fluid may access receptacle 300 via outlet voids 202a because nozzle 200 is fully coupled with receptacle 300.

With reference to FIGS. 1 to 8, nozzle 200 includes a main body 201, a probe 202, 203, 204, 205, 207, and a link or lever 206. The probe includes a nozzle check assembly 207.

The probe is configured to slide or longitudinally translate/move with respect to main body 201. The probe includes a spring seat 202 (also called a body or a dispenser), a poppet engager 203 (also called a body or a plate), a packing 204, fasteners 205 securing spring seat 202 with poppet engager 203, and nozzle check assembly 207.

Nozzle check assembly 207 is configured to equalize pressure of nozzle void 202b (and other voids in fluid communication with nozzle void 202b) with receptacle void 301e prior to complete coupling between nozzle 200 and receptacle 300. Such pressure equalization advantageously reduces the amount of effort required to fully couple nozzle 200 with receptacle 300, which is discussed in detail below.

Spring seat 202 is cylindrical and includes a first portion (not labeled) and a second portion (not labeled). The first portion defines a cylindrical central void 202b and oval-shaped outlet voids 202a (also called outlet ports or window ports). Outlet voids 202a may be any suitable shape. The second portion defines a cylindrical central void 202c for accommodating nozzle check assembly 207 and a cylindrical central void 202d for constantly fluidly communicating void 202b with void 202c.

Figure 2:
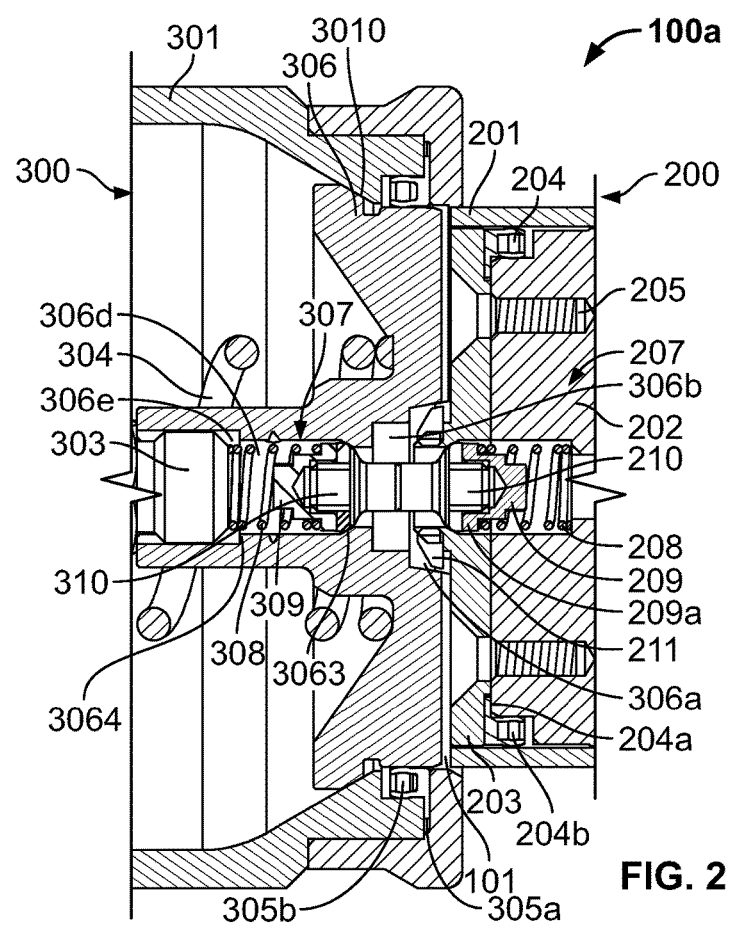
FIG. 2 is an enlarged cross-sectional plan view of zone 2 of FIG. 1.

Outlet voids 202a may be windows defined through an outer perimeter of spring seat 202 such that reference lines perpendicular to the longitudinal axis of nozzle 200 and extending through each of outlet voids 202a intersect a longitudinally centerline of void 202b. Voids 202a, 202b, 202c, 202d (and optionally void 201a—if a nozzle valve (not shown) is disposed upstream of void 201a e.g., in handle 800 or in hose 850) may be in constant fluid communication, both prior to and during full coupling. As shown in FIGS. 1 and 2, spring seat 202 includes a step or shoulder (not labeled) defining an annular recess for receiving packing 204.

Poppet engager 203 is cylindrical and defines a central void (not labeled) for accommodating nozzle check assembly 207. As shown in FIG. 2, the central void includes a cylindrical portion (not labeled) and a partially conical portion (not labeled). Poppet engager 203 includes a sealing surface 203a (also called a valve seat) for nozzle check assembly 207. Poppet engager 203 includes a ring-shaped and longitudinally extending protrusion 203b extending from one end. Protrusion 203b contributes to defining the partially conical portion of the central void of poppet engager 203.

Packing 204 may include a circumferential spring 204b. Operation of circumferential springs in packing material is discussed below with reference to FIGS. 18 to 25. Spring 204b is surrounded by packing material (e.g., polymeric material) on three sides. A fourth side (i.e., the side facing spring seat 202) is open (i.e., at least partially open) to enable fluid admission into circumferential spring 204b. Prior to full coupling, packing 204 is radially compressed between spring seat 202 and main body 201. Packing 204 thus prevents fluid from leaking between main body 201 and spring seat 202 prior to full coupling. Upon full coupling, and as shown in FIG. 7, packing 204 no longer contacts main body 201 and thus does not substantially effect fluid flow. Packing 204 includes an inner portion 204a, which is discussed below with reference to fasteners 205.

Fasteners 205 extend through poppet engager 203 and are threaded into blind bores defined in spring seat 202. Fasteners 205 bind poppet engager 203 to spring seat 202. As shown in FIG. 2, an inner portion 204a of packing 204 extends into an annular groove (not labeled) defined between poppet engager 203 and spring seat 202. Inner portion 204a is compressed or squeezed between poppet engager 203 and spring seat 202 by virtue of fasteners 205. This compression or squeeze retains packing 204 in the annular groove upon full coupling (FIG. 7), where main body 201 no longer exerts a radially inward force on packing 204.

Figure 10:
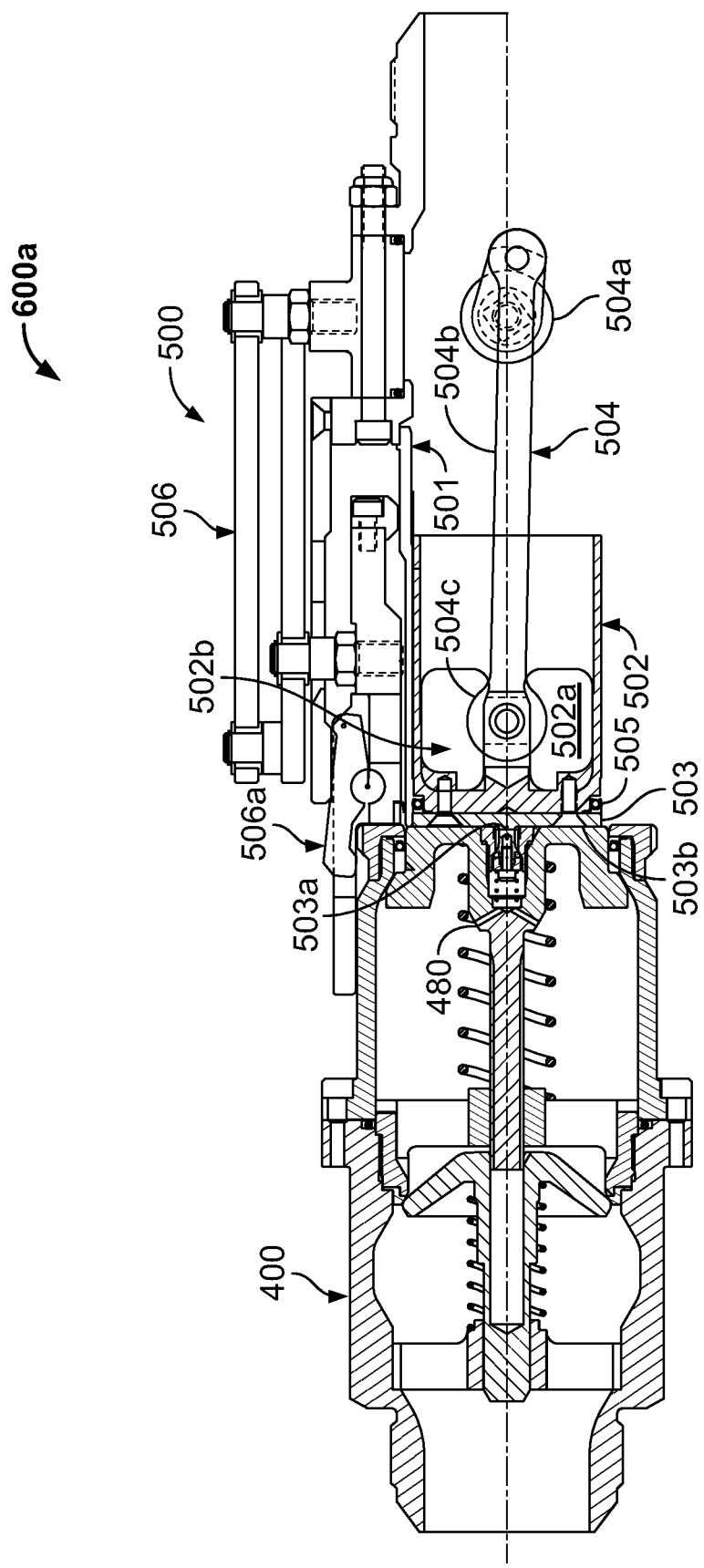
FIGS. 10 to 12 illustrate a coupling sequence between a second nozzle and the second receptacle.

Link or lever 206 may be moveable and/or rotatable (not shown) between an open position and a closed position. Link or lever 206 may be configured to actuate the two-way valve (not shown and previously discussed) disposed in the source hose or conduit 850, the handle 800, or in nozzle 200. When the valve is open, fluid flows from the source hose or conduit to pressurize voids 201a, 202a, 202b, 202c, 202d. Link or lever 206 may be configured to apply a longitudinal force on spring seat 202 to move main body 201, spring seat 202, and poppet engager 203 toward receptacle 300. As shown in FIG. 10, nozzle 200 (corresponding to nozzle 500 in FIG. 10) may include an outer body 506 with one or more coupling arms 506a. Instead of coupling arms 506a, outer body 506 may include other kinds of couplers such as ball bearings. Coupling arms 506a grip receptacle 300 to secure outer body 506 with respect to receptacle 300. As shown in FIG. 10, link or lever 206 (which may correspond to link or lever 504b of FIG. 10) may be part of an assembly 504 including a force originator 504a. Force originator 504a may apply a longitudinal force to link or lever 206 to longitudinally translate main body 201, spring seat 202, and poppet engager 203.

As discussed below, main body 201 and spring seat 202 may be configured to engage and disengage. When main body 201 and spring seat 202 are engaged, both features longitudinally translate as a unit. When main body 201 and spring seat 202 are disengaged, spring seat 202 may longitudinally translate inside of, and with respect to, main body 201. As discussed below, one of main body 201 and spring seat 202 may include an annular tab or protrusion (not shown) and the other of main body 201 and spring seat 202 may define an annular groove or recess for receiving the annular tab (not shown). Additionally, and as discussed below, one of outer body 506 and main body 201 may include a projection (not shown) and the other of outer body 506 and main body 201 may include a step or shoulder configured to contact the projection (not shown).

As link or lever 206 applies longitudinal force to spring seat 202 in the direction of receptacle 300, spring seat 202 and main body 201 longitudinally translate as a unit until main body 201 is stopped against outer body 506 by virtue of the projection contacting the step or shoulder. At this time, the annular tab may disengage from the annular groove or recess, thus enabling spring seat 202 to further longitudinally translate while main body 201 remains stopped. During decoupling, main body 201 may remain stopped until the annular tab engages the annular groove or recess. Upon engagement, main body 201 and spring seat 202 may retract from receptacle 300 as a unit.

As stated above, nozzle check assembly 207 is configured to engage a receptacle check assembly 307. Engagement equalizes nozzle fluid pressure with receptacle fluid pressure, which often reduces the effort required to fully couple nozzle 200 and receptacle 300. More specifically, prior to coupling, pressure in receptacle 300 (e.g., pressure in receptacle void 301e) is typically greater than pressure in nozzle 200 (e.g., pressure in nozzle void 202b). Because nozzle 200 is inserted into receptacle 300 during coupling (see FIG. 7), nozzle 200 reduces the volume of receptacle void 301e. Fluid in receptacle void 301e opposes this reduction in volume and thus opposes insertion of nozzle 200 into receptacle 300.

Check assemblies 207, 307 reduce fluid pressure in receptacle void 301e by transferring fluid in receptacle void 301e to nozzle void 202b prior to nozzle 200 reducing volume of receptacle void 301e. As such, fluid in receptacle void 301e is at a lower pressure and insertion of nozzle 200 into receptacle 300 requires less force.

Figure 8:
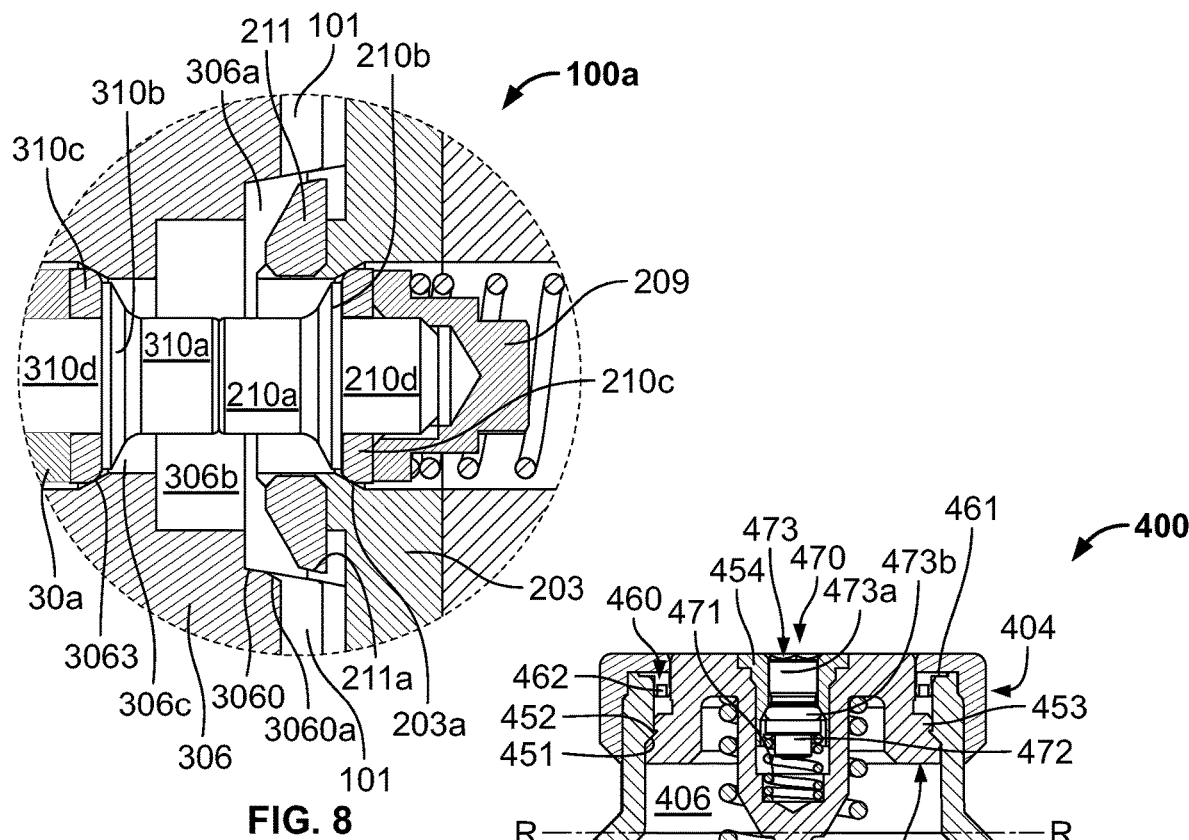
FIG. 8 is an enlarged cross-sectional plan view of zone 8 of FIG. 1.

With reference to FIGS. 1, 2, and 8, nozzle check assembly 207 is disposed in centers of spring seat 202 and poppet engager 203. Nozzle check assembly 207 includes a check spring 208, a spring stop 209, a check 210 (also called a poppet), and a seal assembly 211 (also called a groove and seal assembly).

Check spring 208 sits between spring seat 202 and spring stop 209. Check spring 208 biases check 210 to a closed position where fluid communication is disabled between nozzle void 202c and receptacle void 306a (or ambient atmosphere if receptacle 300 is absent). Spring stop 209 defines a threaded blind bore (not labeled) through which check 210 is disposed. Check 210 may be threaded into the blind bore. Alternatively, check 210 may be unfastened to spring stop 209 and the blind bore may be unthreaded. As shown in FIG. 2, spring stop 209 includes an outer annular flange 209a directly disposed between check spring 208 and an outer portion of check 210.

With reference to FIG. 8, nozzle check 210 includes a cylindrical engaging portion 210a, a partially conical aligning portion 210b, an annular seal 210c, and a cylindrical securing portion 210d. Engaging portion 210a is configured to engage receptacle check 310. Aligning portion 210b, in conjunction with spring stop 209, is configured to compress and retain seal 210c thereby biasing seal 210c into compressive engagement with valve seat or sealing surface 203a when nozzle check assembly 207 is closed. Securing portion 210d is configured to sit within the blind bore defined in spring stop 209. Securing portion 210d may be threadably received in, or otherwise fixed to, spring stop 209 to enhance compression of seal 210c. Engaging portion 210a, aligning portion 210b, and securing portion 210d may be metallic while seal 210c may be polymeric (e.g., a plastic).

Although FIG. 8 shows nozzle check 210 engaging receptacle check 310 while seal assembly 211 is disengaged from receptacle 300, in practice, and as discussed below, seal assembly 211 at least partially engages receptacle 300 before nozzle check 210 and receptacle check 310 begin moving.

Seal assembly 211 includes an annular seal affixed to the annular protrusion of poppet engager 203. Seal assembly 211 is configured to sealingly and compressively engage a sealing surface 3060 of receptacle 300 to discourage fluid leak between an interface gap 101 between nozzle 200 and receptacle 300. As shown in FIG. 8, a radially outward surface of seal assembly 211 may be slanted with respect to the longitudinal axis to match sealing surface 3060, which may be similarly slanted with respect to the longitudinal axis. Sealing surface 3060 may include a minor chamfer 3060a disposed only about a portion of sealing surface 3060. Minor chamfer 3060a may draw sealing surface 211 toward sealing surface 3060.

Nozzle 200 and/or receptacle 300 may be sized, dimension, and/or configured such that at least a portion of seal assembly 211 circumferentially seals against at least a portion of sealing surface 3060 before any of nozzle check assembly 207 and receptacle check assembly 307 open. Nozzle 200 and/or receptacle 300 may be further sized, dimension, and/or configured such that seal assembly 211 fully seals (e.g., has sealed along the full longitudinal length of outer chamfer 211a) after nozzle check assembly 207 has opened, but before receptacle check assembly 310 has opened. With reference to FIGS. 1 to 8, receptacle 300 includes a cylindrical main body 301, a spring seat 302, a stem 303, a spring 304, a packing 305, a poppet 306, and a receptacle check assembly 307. As stated above, receptacle check assembly 307 is configured to engage nozzle check assembly 207 to equalize pressure in receptacle void 301e with pressure in nozzle void 202b prior to full coupling. During coupling, poppet 306 is configured to disengage from main body 301 to enable nozzle 200 to enter receptacle void 301e and thereafter release fluid into receptacle void 301e via voids 202a. As explained below, nozzle 200 engages packing 305 to prevent leakage between nozzle 200 and receptacle 300.

Main body 301 includes a first portion 301a threaded to a second portion 301b. As shown in FIG. 2, packing 305 includes a radially outward portion 305a compressed and thereby retained between first portion 301a and second portion 301b. An inner surface 3010b of second portion 301b is smooth, cylindrical and configured to engage and admit the smooth and cylindrical outer surface of nozzle main body 201. To improve admission of nozzle 200, the inner surface of second portion 301b and the outer surface of nozzle main body 201 may be polished to excellent surface finishes, such that the inner surface of second portion 301b and the outer surface of nozzle main body 201 have higher grade surface finishes (i.e., are more polished) than other components in nozzle 200 and receptacle 300. First portion 301a includes a partially conical valve seat or sealing surface 3010 configured to sealingly engage poppet 306. Main body 301 defines void 301e for directly receiving fluid expelled from nozzle voids 202a, as shown in FIG. 7.

Figure 3:
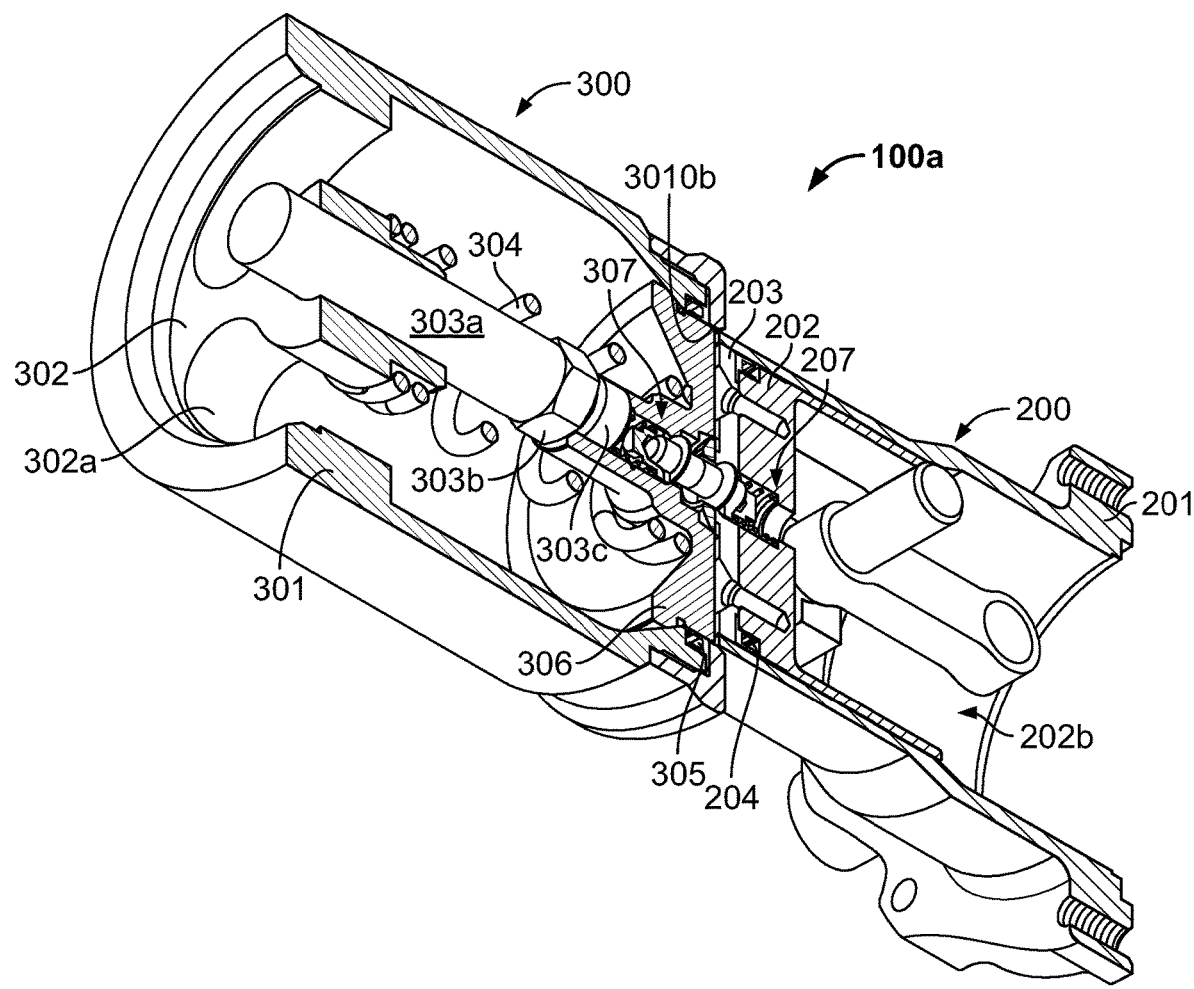
FIG. 3 is a cross-sectional isometric view of the engagement between the first nozzle and the first receptacle.

Spring seat 302 defines a longitudinally extending central cylindrical void (not labeled) for slidably receiving stem 303. Spring seat 302 further defines a plurality of longitudinally extending kidney-shaped outer voids 302a (outer voids 302a may be any suitable shape) for carrying fluid from void 301e to the destination house or conduit. Spring seat 302 is fixed with respect to main body 301. As shown in FIG. 3, spring seat 302 may be integral with main body 301. If non-integral with main body 301, spring seat 302 may be threaded or otherwise secured (not shown) to main body 301.

Stem 303 is configured to enable poppet 306 and thus check assembly 307 to longitudinally move, slide, or translate with respect to main body 301. Stem includes a cylindrical extension portion 303a, a nut or stop 303b, and a head 303c. Extension portion 303a is configured to slide within the central void defined in spring seat 302. One end (not labeled) of poppet 306 contacts nut or stop 303b. Head 303c has an outer diameter less than an outer diameter of nut or stop 303b and may be threaded into poppet 306. A longitudinal end of head 303c is flat and serves as a seat for check spring 308.

According to some embodiments, the inner threads (not labeled) of poppet 306 are longitudinally longer than head 303c to enable user adjustment of the position of head 303c and thus compression of check spring 308. When head 303c has been properly positioned, nut 303b is locked into position to discourage movement of head 303c along the inner threads of poppet 306. According to another embodiment, head 303c is not threaded or otherwise affixed to poppet 306 and thus nut or stop 303b prevents poppet 306 from sliding toward spring seat 302 along stem 303.

Spring 304 is directly disposed between spring seat 302 and poppet 306. Because spring seat 302 cannot move toward the destination hose or conduit (not shown, but disposed at the longitudinal end of body 301 adjacent spring seat 302), spring 304 biases poppet 306 to a closed position where poppet 306 sealingly engages valve seat or sealing surface 3010.

Packing 305 includes outer radial and annular portion 305a compressively retained between first and second portions 301a, 301b of main body 301. Packing 305 includes a circumferential spring 305b As stated above, circumferential springs are discussed below with reference to FIGS. 18 to 25. As with all circumferential springs disclosed herein, packing material (e.g., polymeric material) may surround three sides of circumferential spring 305b, while one side (e.g., the side of spring 305b facing gap 305c) is left open to enable fluid admission into spring 305b.

Figure 5:
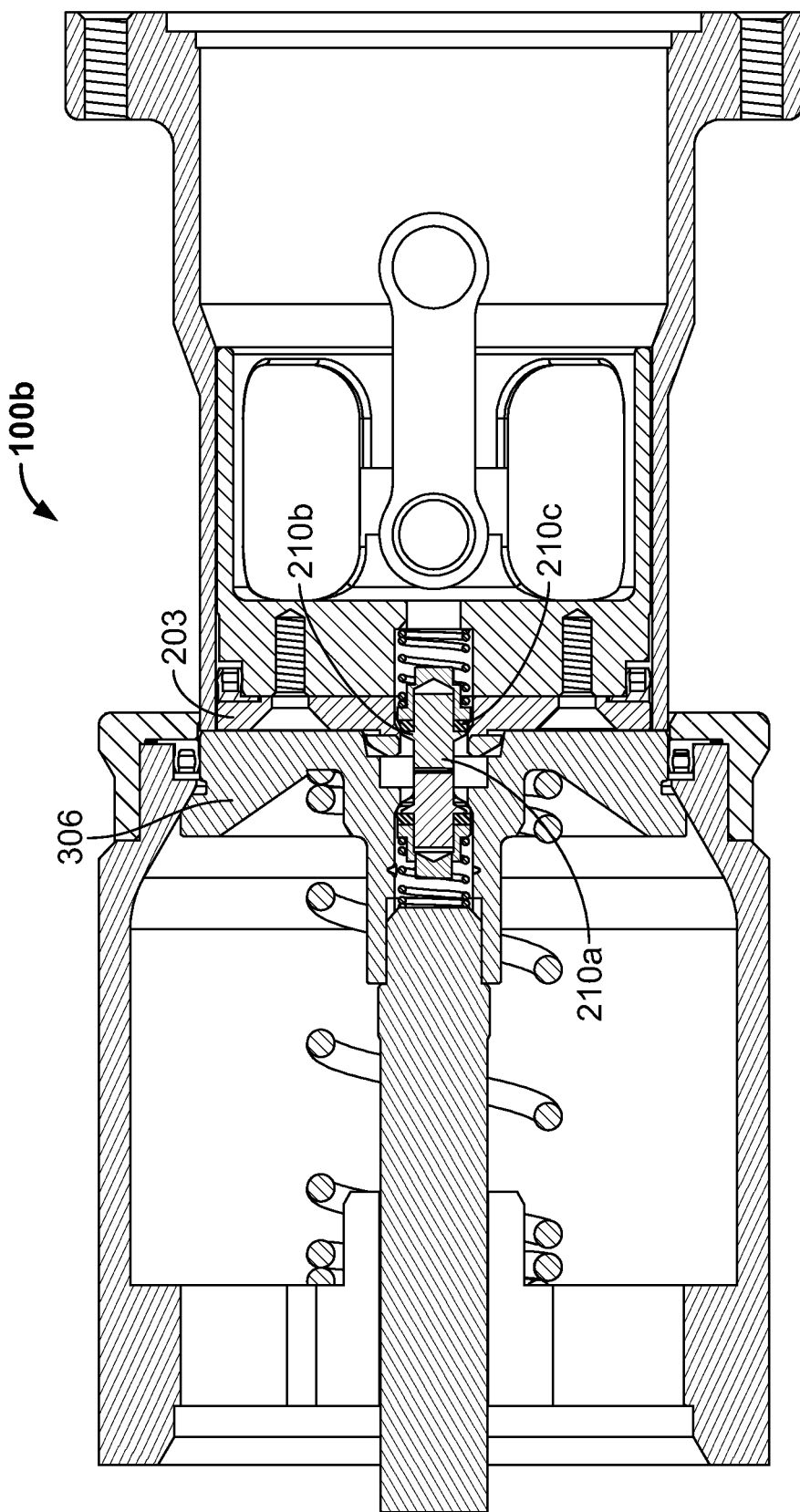
Figure 6:
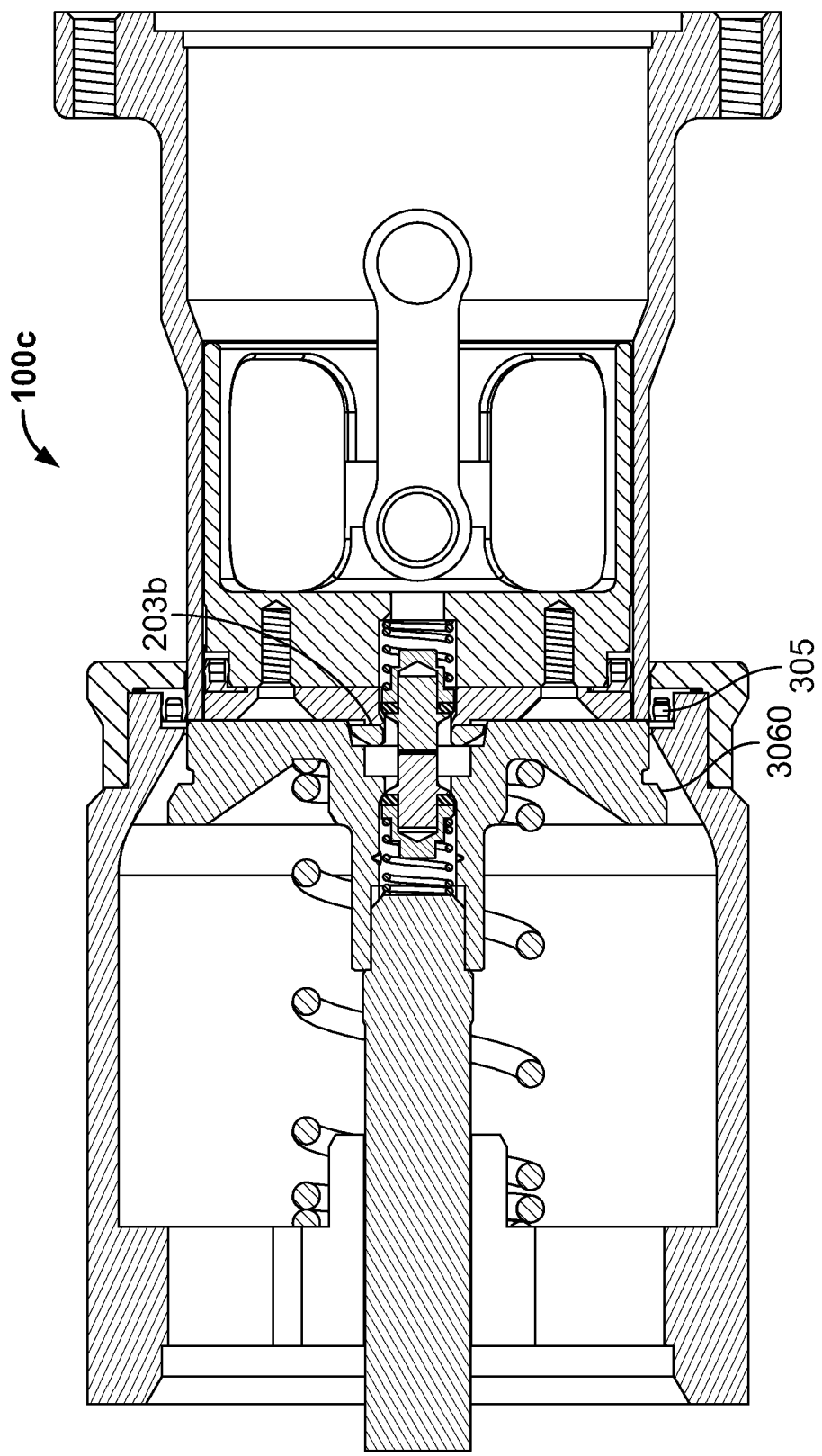

Prior to coupling (not shown) and during some initial stages of coupling (see FIGS. 1 to 5), packing 305 is compressed between main body 301 and poppet 306 to prevent fluid leakage between main body 301 and poppet 306. As shown in FIGS. 6 and 7, the cylindrical outer surface of nozzle main body 201 eventually displaces poppet 306 from packing 305 and packing 305 becomes compressed between receptacle main body 301 and nozzle main body 201. In this position, packing 305 prevents fluid leakage between receptacle main body 301 and nozzle main body 201.

Poppet 306 is configured to move, slide, or translate between (a) a closed position where poppet 306 engages packing 305 (b) an open position where poppet 306 is disengaged from packing 305. FIG. 1 shows the closed position and FIG. 7 shows the open position. Poppet 306 may include a partially conical inner surface 3060, chamfer 3061, and an annular groove 3062. Annular groove 3062 may be fluidly connected with one or more channels (not shown) defined in poppet 306, which enable fluid in receptacle void 301e to reach the inside of circumferential spring 305b when poppet 306 is closed. Partially conical inner surface 3060 may stop against inner surface 3010 of receptacle main body 306 when poppet 306 is in the closed position.

Poppet 306 defines a partially conical void 306a, a cylindrical void 306b, a cylindrical void 306c, a main void 306d with a first partially conical portion (not labeled) and a second cylindrical portion (not labeled), and a cylindrical void 306e. As previously discussed, cylindrical void 306e may be defined by threads for receiving head portion 303c of stem 303. Voids 306a to 306e may be centrally disposed in poppet 306 (i.e., central axes of the voids may be collinear with a central axis of receptacle 300 and/or with a central axis of poppet 306). Poppet 306 may further define one or more communicating voids (e.g., cross drillings 480 of FIG. 10) fluidly communicating void 306d with void 301e.

Poppet 306 includes an annular and partially conical valve seat or sealing surface 3063 for engaging check 310 and closing check assembly 307. Poppet 306 includes a step or shoulder 3064 for stopping longitudinal movement of stem 303 toward check 310.

As stated above, receptacle check assembly 307 is configured to engage nozzle check assembly 207 to fluidly communicate receptacle void 301e with nozzle void 202b. Such fluid communication often reduces pressure in receptacle void 301e. As previously discussed, the inclusion of receptacle check assembly 307 and nozzle check assembly 207 represents an improvement over at least some known nozzles and receptacles.

According to some embodiments, force required to open a receptacle poppet with a nozzle is determined by fluid force acting on the receptacle poppet plus other forces (e.g., spring forces). Fluid force acting on the receptacle poppet is equal to surface area of the poppet exposed to fluid multiplied by fluid pressure. After the receptacle has been opened and the pressure between the receptacle and the nozzle has equalized, the force required to further open the receptacle is determined by only the other forces (i.e., not fluid pressure acting on the poppet).

According to some embodiments, receptacle check or poppet 310 has a much smaller surface area than receptacle poppet 306. As a result, the fluid force acting on receptacle check or poppet 310 is much smaller than the fluid force acting on receptacle poppet 306. Embodiments of the present disclosure open receptacle check or poppet 310 before opening receptacle poppet 306. Receptacle check or poppet 310, in conjunction with nozzle check or poppet 210, equalizes the pressure between nozzle and receptacle. Therefore, a user needs oppose fluid force acting on receptacle check or poppet 310 but does not need to oppose fluid force acting on receptacle poppet 306. Because the force acting on receptacle check or poppet 310 is small compared with the fluid force acting on receptacle poppet 306, the maximum amount of force that must be exerted during the coupling process of disclosed embodiments is much smaller than the maximum force required for existing designs.

With reference to FIGS. 1 to 8, receptacle check assembly 307 (all check assemblies disclosed herein may be referred to as pilot assemblies) includes a check spring 308, a spring stop 309, and a check 310 (all checks disclosed herein may be referred to as poppets or pilots). Check assembly 307 may be centrally disposed in poppet 306 and/or main body 301 such that nozzle check assembly 207 is aligned with receptacle check assembly 307 during the coupling process.

Check spring 308 is directly disposed between head portion 303c of stem 303 and spring stop 309. Check spring 308 biases check 310 into a closed position where check 310 is in sealing engagement with valve seat or sealing surface 3063 of poppet 306. The closed position disables fluid communication of (a) voids 306a, 306b, and 306c with (b) voids 306d, 306e, and 301e.

Spring stop 309 defines a threaded blind bore (not labeled) through which check 310 is disposed. Check 310 may be threaded into the blind bore. Alternatively, check 310 may be unfastened to spring stop 309 and the blind bore may be unthreaded. Spring stop 309, like spring stop 209, includes an outer annular flange (not labeled) directly disposed between check spring 308 and an outer portion of check 310.

With reference to FIG. 8, receptacle check 310 includes a cylindrical engaging portion 310a, a partially conical aligning portion 310b, an annular seal 310c, and a cylindrical securing portion 310d. Engaging portion 310a is configured to engage nozzle check 210. A circular longitudinal end (not labeled) of receptacle engaging portion 310a may have the same surface area and diameter of the circular longitudinal end (not labeled) of nozzle engaging portion 210a.

Aligning portion 310b, in conjunction with spring stop 309, is configured to compress and retain seal 310c, thereby biasing seal 310c into compressive contact with valve seat or sealing surface 3063 when receptacle check assembly 307 is closed. Securing portion 310d sits within the blind bore defined in spring stop 309. Securing portion 310d may be threadably received in, or otherwise fixed to, spring stop 309 to enhance compression of seal 310c. Engaging portion 310a, aligning portion 310b, and securing portion 310d may be metallic while seal 310c may be polymeric (e.g., a rubber, a plastic).

To simplify manufacturing, spring stop 309 and check 310 of receptacle 300 may be identical to spring stop 209 and check 210 of nozzle 200. Receptacle check spring 308 may have a greater spring constant than nozzle check spring 208 to cause nozzle check assembly 207 to open before receptacle check assembly 307.

Figure 4:
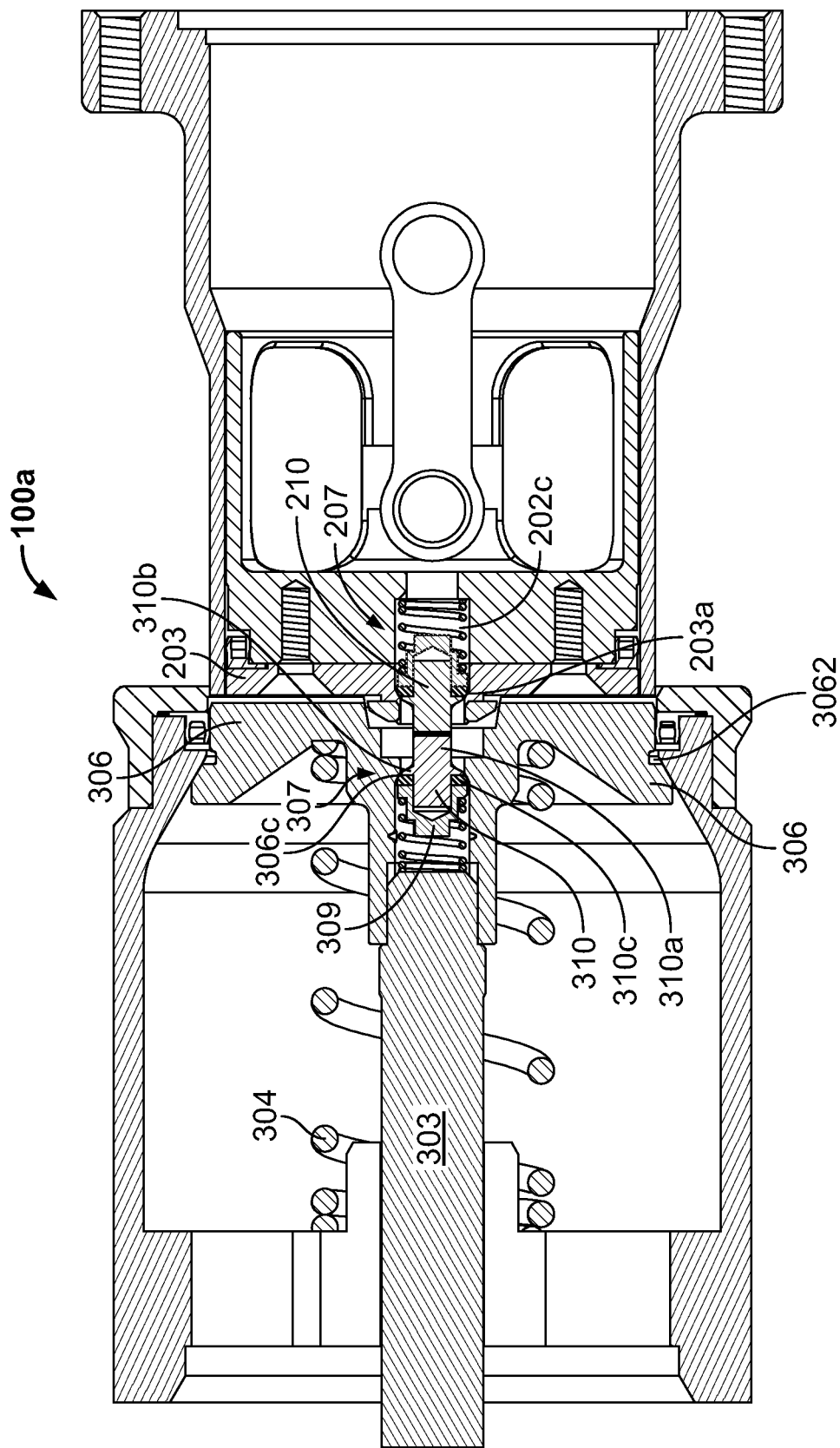
FIGS. 4 to 7 illustrate a coupling sequence between the first nozzle and the first receptacle.

An exemplary coupling and decoupling of nozzle 200 with receptacle 300 is described below with reference to FIGS. 4 to 7. FIG. 4 shows a first coupling stage 100a, which represents a beginning of the coupling process and an end of the decoupling or retracting process. FIGS. 1 to 3 and 8 also show the first coupling stage 100a. FIG. 5 shows a second coupling stage 100b, which occurs after first coupling stage 100a during coupling and before first coupling stage 100a during decoupling. FIG. 6 shows a third coupling stage 100c, which occurs after second coupling stage 100b during coupling and before second coupling stage 100b during decoupling. FIG. 7 shows a fourth coupling stage 100d, which represents an end of the coupling process and a beginning of the decoupling process. FIGS. 4 to 7 do not show movement of check assemblies 207, 307.

As shown in FIG. 4, a user inserts nozzle main body 201 into receptacle main body 301. Although not shown in FIGS. 4 to 7, an outer body 506 of nozzle 200 latches to receptacle 300 to disable movement of receptacle outer body 301. As previously discussed, an example of the outer body 506 is shown in FIG. 10. In FIG. 10, nozzle outer body 506 includes one or more latches (also called coupling arms) 506a that bind nozzle outer body 506 to a receptacle main body.

Returning to FIG. 4, nozzle check 310 may begin to engage receptacle check 310 or may be slightly spaced therefrom. As shown in FIG. 4, poppet engager 203 is spaced from poppet 306 by interface gap 101. Neither nozzle check 207 nor receptacle check 307 is open at this stage. The user continues to press nozzle main body 201 into receptacle main body 301 until seal assembly 211 circumferentially engages at least a portion of inner surface 306*o* of poppet 306.

As previously discussed, spring seat 202 may include a radially outwardly extending flexible tab (not shown) configured to engage an annular inner recess of nozzle main body 201 (not shown). Engagement between the flexible tab and the annular inner recess may cause main body 201 to longitudinally extend with spring seat 202 until main body 201 contacts a hard stop (discussed above and further discussed below). At that point, the flexible tab may disengage from main body 201 to enable relative movement between spring seat 202 and main body 201. Alternatively, the flexible tab may radially inwardly extend from main body 201 into an outer radial recess defined in spring seat 202 (not shown).

Upon engagement of seal assembly 211 with inner surface 306*o*, receptacle check 310 forces nozzle check 210 open while receptacle check 310 remains closed. More specifically, receptacle check 310 applies a first force against nozzle check 210 and nozzle check 210 applies a second, opposite force against receptacle check 310. Receptacle check 310 transmits the first force to receptacle check spring 308, which applies the force to stem head portion 303*c*. When stem head portion 303*c* is threaded into poppet 306, as is preferred, stem 303 does not move toward spring seat 302 by virtue of a counterforce applied by main spring 304 to poppet 306 (which has a larger spring constant than receptacle check spring 308). When stem head portion 303*c* is not threaded into poppet 306, another feature (not shown) prevents stem 303 from longitudinally sliding toward spring seat 302. This other feature may be a stopping tab (not shown) disposed in void 306*e* or a moveable lever configured to occupy a stopping position that arrests longitudinal movement of stem 303 toward spring seat 302.

Because stem head portion 303*c* is stopped and because the spring constant of receptacle check spring 308 exceeds the spring constant of nozzle check spring 208, receptacle check 310 remains closed while nozzle check 210 disengages from valve seat or sealing surface 203*a*, thus opening nozzle check assembly 207. Fluid communication is now enabled between nozzle void 202*b* and receptacle void 306*b*.

The user continues pressing nozzle 200 into receptacle 300 until poppet engager 203 contacts poppet 306. At a point in time prior to firm contact between poppet engager 203 and poppet 306, nozzle check 210 stops moving toward spring seat 202. The stop may be provided by an annular stop (not shown) disposed in spring seat 202. The stop may be provided by the enhanced compression of nozzle check spring 208.

Although nozzle check 210 has stopped, the user continues pressing nozzle 200 into receptacle 300. By the point of firm contact between poppet engager 203 and poppet 306, nozzle check assembly 207 applies sufficient force against receptacle check assembly 307 to overcome the biasing force of receptacle check spring 308 and disengage receptacle check 310 from valve seat or sealing surface 306*a*. It should thus be appreciated that nozzle 200 and receptacle 300 are configured such that nozzle check assembly 207 and receptacle check assembly 307 are both opened prior to, or at the point of, firm contact between poppet engager 203 and poppet 306.

Once both check assemblies 207, 307 have opened, fluid communication between receptacle void 301*e* and nozzle void 202*b* is enabled by way of receptacle void 306*b*. Fluid flows from receptacle void 301*e* into nozzle void 202*b* (or from nozzle void 202*b* into receptacle void 301*e* if fluid pressure in nozzle void 202*b* exceeds fluid pressure in receptacle void 301*e*). Because fluid pressure in receptacle void 301*e* is typically greater than fluid pressure in nozzle void 202*b*, the pressure in receptacle void 301*e* will typically decrease.

In FIGS. 5 to 7, poppet engager 203 is firmly contacting poppet 306 and thus both of nozzle check assembly 207 and receptacle check assembly 307 are open. As stated above, FIGS. 4 to 7 omit movement of nozzle check assembly 207 and receptacle check assembly 307.

The user may wait for the pressure in receptacle void 301*e* to fully equalize with the pressure in nozzle void 202*b* by maintaining the position of FIG. 5. Alternatively, the user may continue to insert nozzle 200 further into receptacle 300. Poppet engager 203 pushes poppet 306 toward receptacle spring seat 302, causing surface 306*o* of poppet 306 to disengage from surface 301*o* of receptacle main body 301. As shown in FIG. 6, packing 305 continues to sealingly engage poppet 306. Eventually, as shown in FIG. 7, poppet 306 disengages from packing 305 while receptacle main body 201 engages packing 305. It should thus be appreciated that packing 305 is perpetually radially sealed against at least one of poppet 306 and receptacle main body 201. An alternative embodiment of packing 305 is discussed below with reference to FIGS. 18 to 25.

Nozzle main body 201 stops in the position of FIG. 6. The stop may be provided by a stopping feature (not shown) of nozzle 200 engaging a corresponding stopping feature (not shown) of receptacle 300. With reference to FIG. 10, the stop may be provided between engagement between nozzle main body 201 and the outer body 506 of nozzle 200 (nozzle 200 corresponds to nozzle 500 in FIG. 10). More specifically, the outer body 506 may include an inner step or shoulder serving as a stop for a radially outwardly extending flange of nozzle main body 201. Alternatively, the outer body 506 may include an outer step or shoulder serving as a stop for a radially inwardly extending flange of the nozzle outer body 506.

The user continues to press nozzle 200 into receptacle 300. Although nozzle main body 201 has been stopped in the position shown in FIGS. 6 and 7, spring seat 202, poppet engager 203, and link or lever 206 continue to move toward receptacle spring seat 302, thus fully disengaging poppet 306 from packing 305. Poppet engager 203, spring seat 202, and link or lever 206 continue to move toward receptacle spring seat 302 until nozzle voids 202*a* are directly exposed to receptacle void 301*e*. Nozzle 200 may include a stopping feature (not shown) preventing ingress of spring seat 202 past the position shown in FIG. 7. Upon full coupling of FIG. 7, the user actuates lever or link 206 (or another feature) to fluidly communicate nozzle void 202*b* with the source hose or conduit (not shown). Fluid now flows from nozzle 200 into receptacle 300.

Decoupling occurs in the reverse order. During decoupling, nozzle check assembly 207 and receptacle check assembly 307 both remain open at least until poppet engager 203 is no longer in firm contact with poppet 306. As a result, pressure in nozzle void 202*b* is transferred into receptacle void 301*e*, thus reducing the difficulty of retracting spring seat 202 into nozzle main body 201. Receptacle check assembly 307 closes before nozzle check assembly 207.

As shown in FIG. 8, once seal assembly 211 disengages from inner surface 306*o* of poppet 306, fluid disposed between nozzle 200 and receptacle 300 in voids 306*a*, 306*b*, and 306c vents into ambient atmosphere via interface gap 101. As such, a manufacturer may minimize vented fluid by reducing the size of voids 306a, 306b, and 306c. According to preferred embodiments, the volumetric sum of fluid vented into atmosphere upon decoupling is less than 10, 5, or 2 cubic centimeters. According to an especially preferred embodiment, the volumetric sum of fluid is less than or equal to 1 cubic centimeter. Fluid vented during decoupling by existing receptacles is often 25 cubic centimeters.

Figure 9:
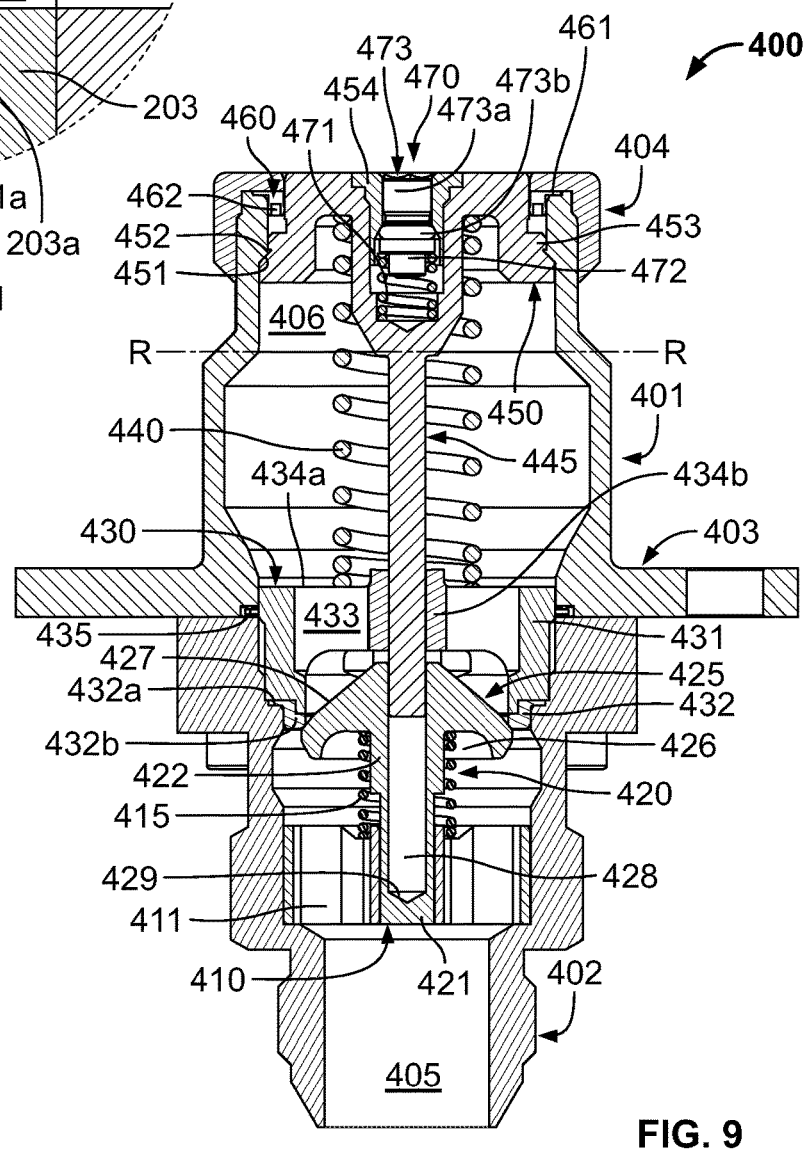
FIG. 9 is a cross-sectional plan view of a second receptacle.
Figure 11:
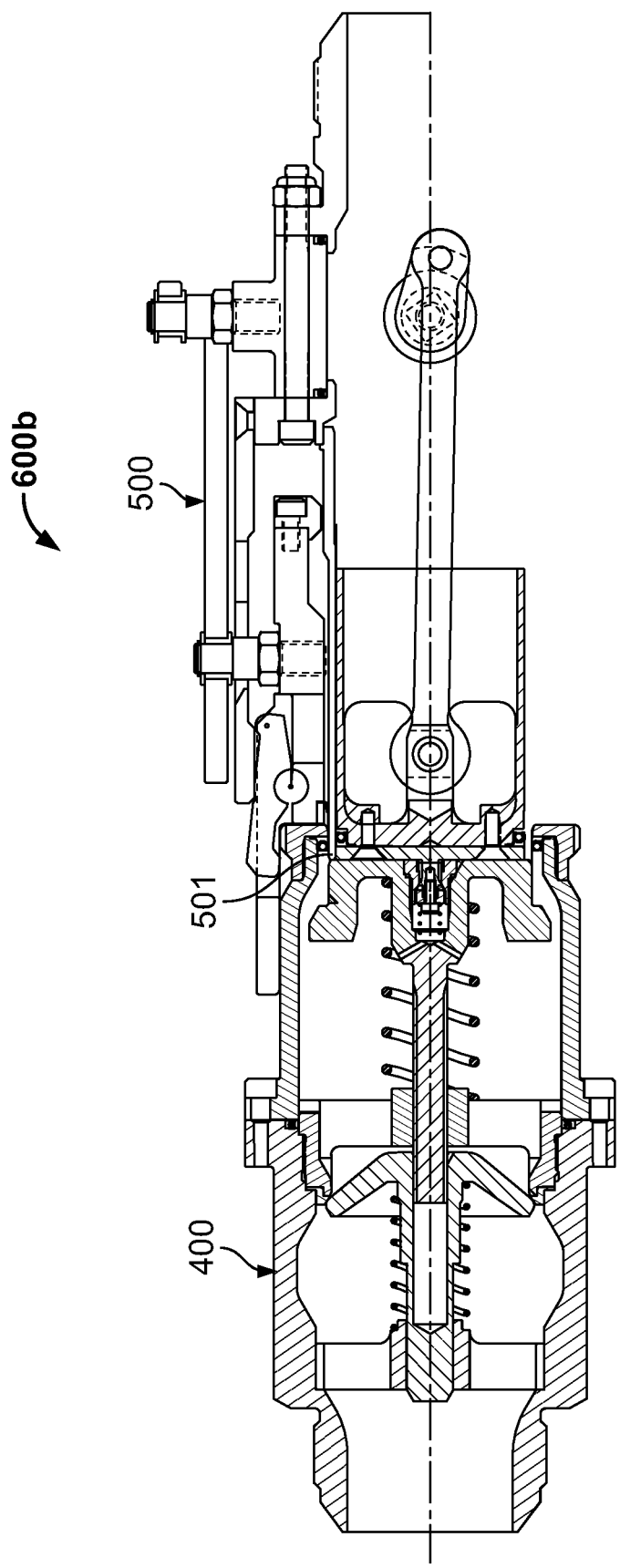
Figure 12:
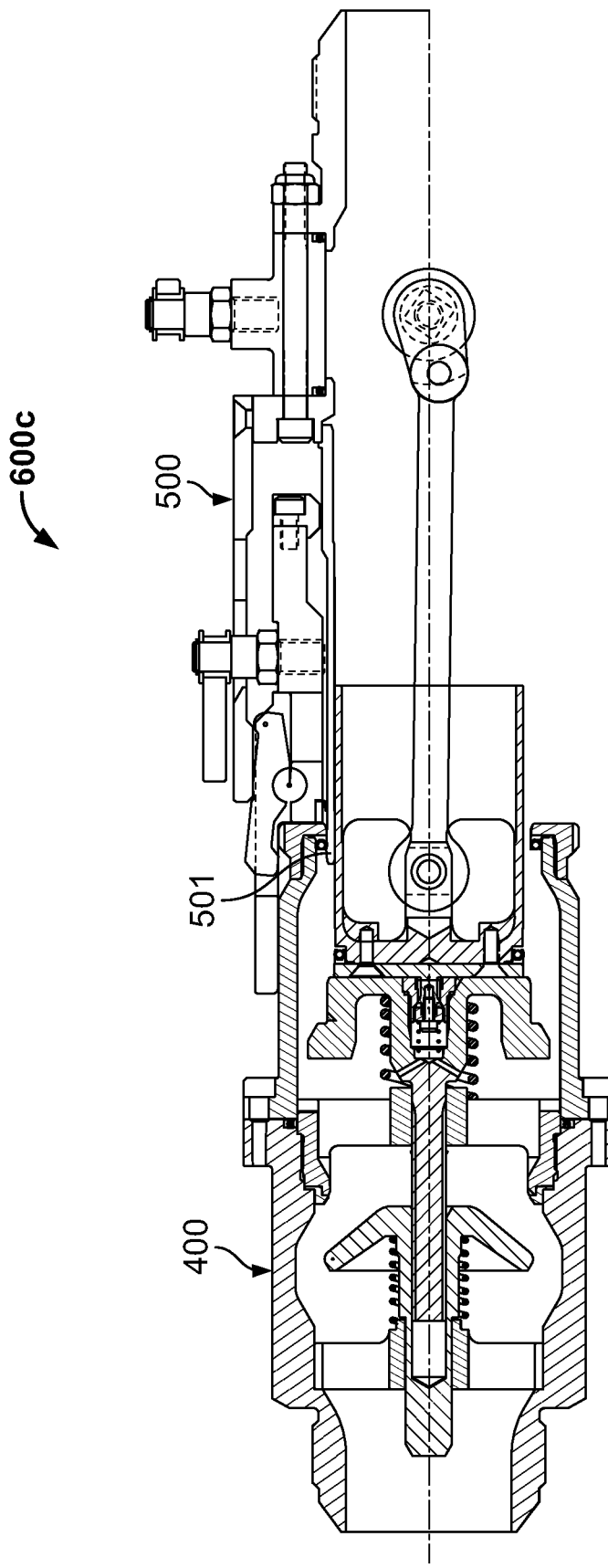
Figure 13:
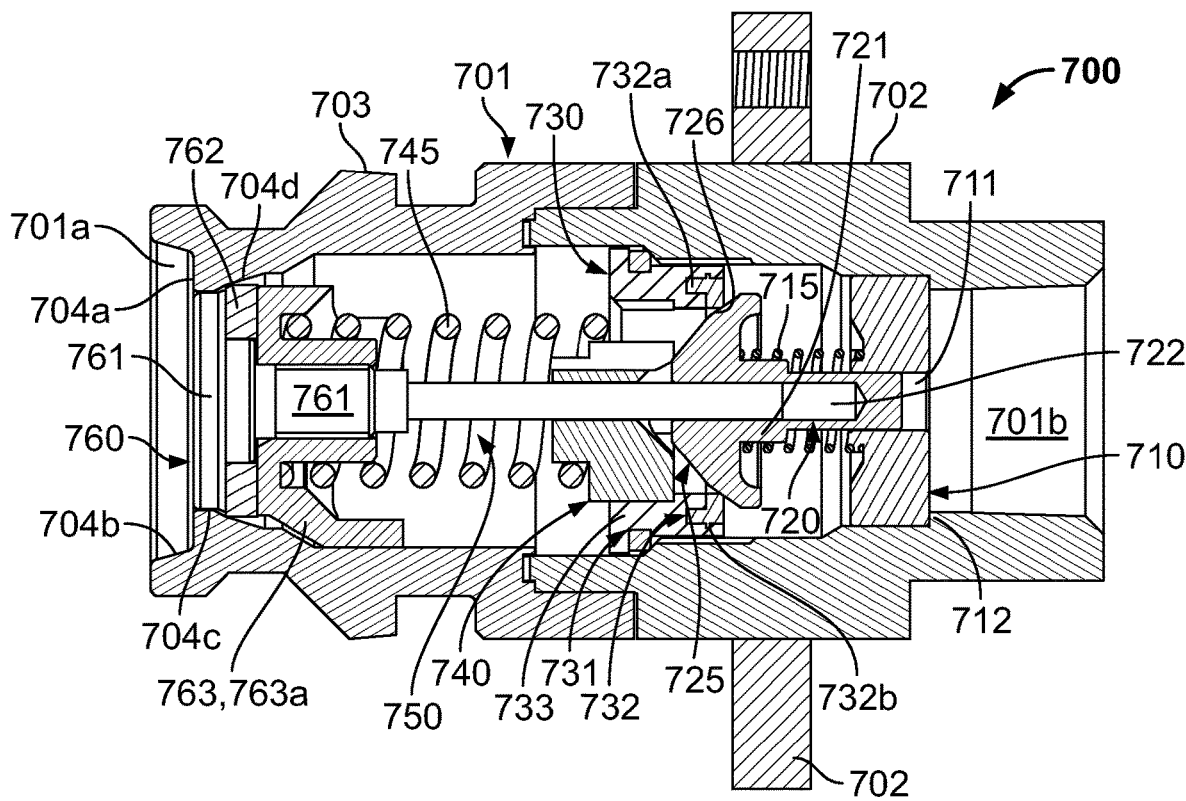
FIG. 13 is a cross-sectional plan view of a third receptacle.
Figure 14:
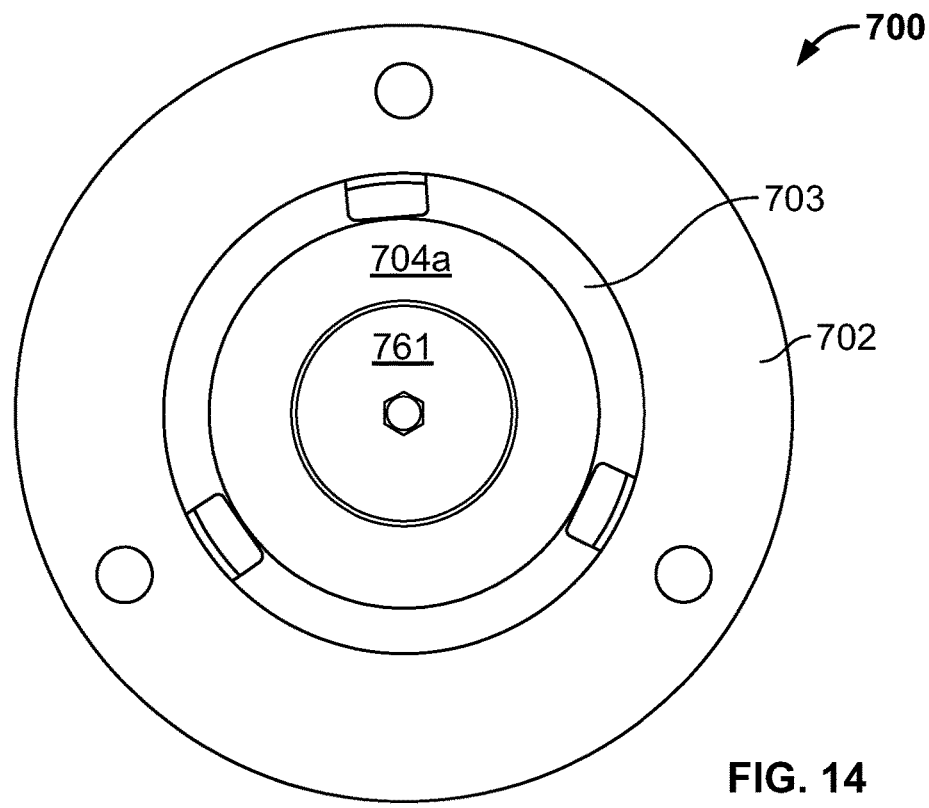
FIG. 14 is a top plan view of the third receptacle.
Figure 15:
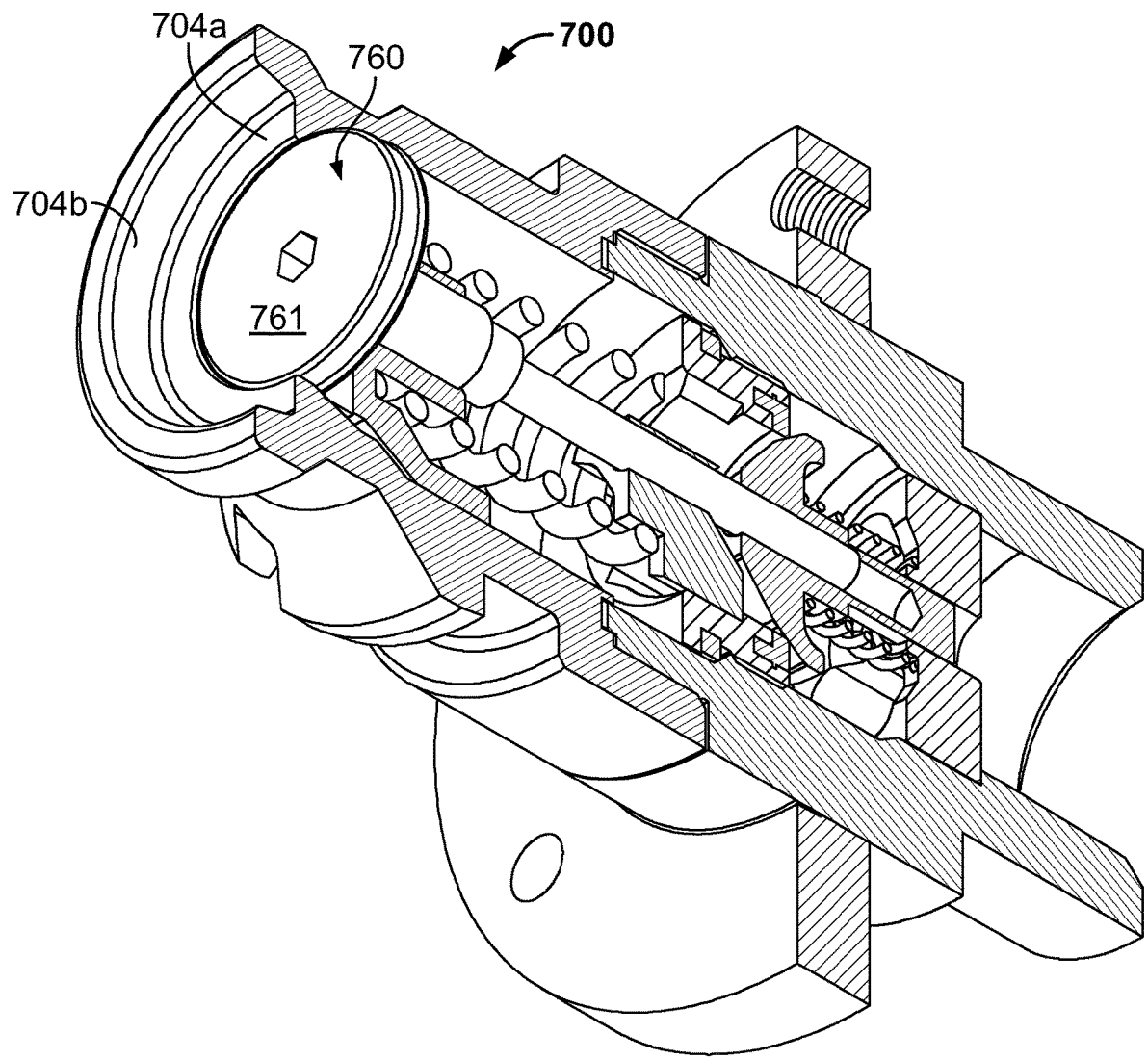
FIG. 15 is a cross-sectional isometric view of the third receptacle.

FIG. 9 shows a second embodiment of a receptacle 400. FIGS. 10 to 12 show a second embodiment of a nozzle 500 configured to couple with receptacle 400. It should be appreciated that nozzle 500 of FIGS. 10 to 12 may be include a nozzle check assembly (not shown and discussed below).

As shown in FIGS. 9 to 12, receptacle 400 includes a main body 401, a spring seat 410, a first spring 415, a first stem 420, a first poppet 425, a first valve seat 430, a packing 435, a second spring 440, a second stem 445, a second poppet 450, a packing 460, and a check assembly 470. Receptacle check assembly 470 is configured to operate similar to receptacle check assembly 307. More specifically, receptacle check assembly 470 is configured to engage nozzle check assembly (not shown, but similar to nozzle check assembly 207) to equalize pressure of receptacle 400 with pressure of nozzle 500.

Main body 401 includes a first portion 402 affixed (e.g., threaded or fastened) to a second portion 403 and a third portion 404 affixed (e.g., threaded) to second portion 403. First portion 402 defines an outlet port 405. Third portion 404 defines an inlet port 406.

Spring seat 410 may be threaded to first portion 402 or may be integral with third portion 402. Spring seat 410 defines longitudinally extending voids 411 for enabling fluid flow across spring seat 410 and toward outlet port 405. Spring seat 410 defines a central void (not labeled) for slidably receiving first stem 420. First spring 415 sits directly between spring seat 410 and poppet 425. First main spring 415 biases poppet 425 to a closed position where poppet 425 sealingly and compressively engages valve seat 430.

Stem 420 is affixed (e.g., integral or threaded) to poppet 425. Stem 420 includes a cylindrical first portion 421 for moving or sliding within spring seat 410. Stem 420 includes a cylindrical second portion 422 for stopping against spring seat 410 and thereby arresting longitudinal translation of stem 420 and poppet 425 toward outlet port 425.

Poppet 425 is affixed (e.g., integral or threaded) to poppet 425. Poppet 425 defines an annular recess 426 for receiving first spring 415. Poppet 425 includes a partially conical outer surface 427 for sealingly engaging valve seat 430.

Stem 420 and poppet 425 define a longitudinally extending cylindrical blind bore 428 for slidably receiving second stem 445. First spring 425 retains poppet 425 in the closed position until (a) second stem 445 contacts inner stop 429 or (b) fluid pressure exerted on outer surfaces of poppet 425 biasing poppet 425 toward spring seat 410 exceed the biasing force of first spring 415. According to a less preferred, but advantageous embodiment, second stem 445 may be sized to never contact inner stop 429.

Valve seat 430 includes a cylindrical body 431 and an annular packing 432. Annular packing 432 is retained in position by virtue of being compressed between cylindrical body 431 and first portion 402 of main body 401. Cylindrical body 431 is retained in position by virtue of annular packing 432 and second spring 440. Alternatively, cylindrical body 431 is threaded into second portion 402 of main body 401.

Annular packing 432 includes a first annular portion 432a and a second annular portion 432b. First annular portion 432a is compressed between cylindrical body 431 and an inner ledge (not labeled) of second portion 402 of main body 401. Second annular portion 432b serves as a valve seat or sealing surface for first poppet 425.

Cylindrical body 431 defines inner voids 433 for enabling fluid flow from inlet port 406 to first poppet 425. Cylindrical body 430 includes an annular upper surface 434a partially defining inner void 433 and serving as a seat for second spring 440. Cylindrical body 431 includes guiding portion 434b defining a longitudinally extending cylindrical void (not labeled) for receiving second stem 445. Guiding portion 434b protrudes above annular upper surface 434a.

Packing 435 is annular and sits in an annular recess defined in second portion 403 of main body 401. Packing 435 is compressed between first portion 402, second portion 403, and valve seat 430. Packing 435 thus discourages fluid leak (a) between the interface of first portion 402 and second portion 403 and (b) between second portion 402 and valve seat 430. Packing 435 may include a circumferential spring (not labeled) and the packing may be configured to admit fluid into the circumferential spring.

Second stem 445 is cylindrical and affixed (e.g., integral or threaded) to second poppet 450. Second spring 440 sits between valve seat 430 and second poppet 450. Because valve seat 430 is fixed in place, second spring 440 biases second poppet 450 to a closed position.

Second poppet 450 includes an annular outer surface 451 configured to engage an outer annular protrusion 452 of second portion 403. Outer annular protrusion 452 thus serves as a secondary valve seat or secondary sealing surface for second poppet 450. A primary valve seat or sealing surface (not labeled) may lie directly below protrusion 452. Although FIG. 9 shows second poppet 450 including an annular outward protrusion 453, protrusion 453 may be absent to enable poppet 450 to move or slide toward outlet port 405. Alternatively, protrusion 453 may be present and second poppet 450 may be polymeric, thus enabling main body protrusion 452 to inwardly compress poppet protrusion 453.

Poppet 450 defines a central blind bore (not labeled) for accommodating check assembly 470. Poppet 450 includes an ring 454 fixed inside of the central blind bore. Ring 454 may be integral with poppet 450 or may be threaded into the central blind bore. Poppet 450 defines cross drillings 480 (see FIG. 10) fluidly communicating the central void with inlet port 406.

As stated above, second spring 440 biases poppet 450 to a closed position whereby poppet 450 sealingly engages main body protrusion 452. Because second stem 445 is affixed to second poppet 450, second spring 440 biases stem 445 away from stop 429 of first stem and poppet 420, 425.

Packing 460 includes an annular radially outwardly extending portion 461 compressed and retained between second portion 403 and third portion 404. Packing 460 includes a circumferential spring 462 biasing packing 460 into compressive contact with an outer surface (not labeled) of second poppet 450. As with all circumferential springs disclosed herein, circumferential spring 462 may be disposed in a pocket or groove defined in the packing material of packing 460, thus enabling fluid to occupy spring 462 (when spring 462 is exposed to fluid).

Receptacle check assembly 470 includes a check spring 471, a spring stop 472, and a check 473. Check 473 may include some or all of the features of receptacle check 310. Check 473 may include a cylindrical engaging portion 473a, a partially conical aligning portion (not shown), an annular seal 473b, and a cylindrical securing portion (not shown). The partially conical aligning portion and the cylindrical securing portion may resemble the corresponding features of receptacle check 310. Check spring 471 biases annular seal 473b of check 473 into sealing engagement with ring 454.

With reference to FIG. 10, nozzle 500 includes a main body 501, a dispenser 502, a poppet engager 503, a link assembly 504, a packing 505, and an outer body 506. Nozzle 500 is configured to engage receptacle 400 and enable transmission of fluid from the source (not shown) into receptacle 400. Outer body 506 includes one or more couplers 506a (e.g., latches or ball bearings) configured to secure receptacle 400 with respect to outer body 506. A combination of dispenser 502, poppet engager 503, packing 505, and a nozzle check assembly (if present) may be referred to as a probe. As stated above, outer body 506 is also used to describe features of nozzle 200.

Main body 501 is annular and surrounds dispenser 502 and poppet engager 503 prior to coupling and during a first coupling step 600a, as shown in FIG. 10. Although FIG. 10 only shows main body 501 surrounding one side of dispenser 502 and poppet engager 503, main body 501 circumferentially surrounds all sides of dispenser 502 and poppet engager 503.

Dispenser 502 is similar to spring seat 202 of nozzle 200. Dispenser 502 defines outer voids 502a and a cylindrical inner void 502b. Outer voids 502a are windows to inner void 502b, similar to voids 202a of nozzle 200. Poppet engager 503 is a cylindrical plate secured to dispenser 502. Poppet engager 503 includes a cylindrical protrusion 503a extending from a flat annular end 503b.

Link assembly 504 includes force originator 504a, a link or lever 503b, and a force applicator 504c. Force applied to force originator 504a is transmitted via link or lever 503b to force applicator 504c to move main body 501 and/or dispenser 502. Force applicator 504c is connected to dispenser 502. Link or lever 206 of nozzle 200 may correspond to link or lever 503b of nozzle 500, such that nozzle 200 is longitudinally translated similar to nozzle 500.

Dispenser 502 may include an annular tab (not shown) and main body 501 may define an annular groove (not shown) for the annular tab. Dispenser 502 thus applies longitudinal force to main body 501 until main body 501 reaches a maximum longitudinal extension (see FIGS. 11 and 12). The annular tab may then disengage from the annular groove, thus enabling receiver 502 to move or slide with respect to main body 501 (see FIG. 12).

Packing 505 may be configured similar to packing 204 of nozzle 200 and include (a) an annular inward portion (not labeled) compressed between dispenser 502 and poppet engager 503 and (b) a circumferential spring (not shown) biasing packing 505 into compressive engagement with main body 501. As with all circumferential springs disclosed herein, the circumferential spring of packing 505 may be only partially surrounded by packing material to enable fluid admission into the circumferential spring.

Nozzle 500 may include a check assembly (not shown) similar to nozzle check assembly 207. Nozzle 500 may be configured to include some or all of the features of nozzle 200 shown in box 2 of FIG. 1, including nozzle check assembly 207. As a result, dispenser 502 may act as a spring plate for the check spring, similar to spring plate 202. Dispenser 502 may define voids fluidly communicating the nozzle check assembly with inner void 502b.

A coupling and de-coupling process will now be described with reference to FIGS. 10, 11, and 12. With respect to the process, FIG. 10 shows a first stage 600a. FIG. 11 shows a second stage 600b. FIG. 12 shows a third stage 600c. A coupling process between nozzle 500 and receptacle 400 begins at first stage 600a and ends at third stage 600c. A decoupling or retraction process between nozzle 500 and receptacle 400 begins at third stage 600c and ends at first stage 600a.

A user secures nozzle outer body 506 to receptacle 400 via one or more latches 506a. When nozzle 500 does not include a check assembly, the user presses protrusion 503a against receptacle check 473 before poppet engager 503 firmly engages poppet 450. Protrusion 503a opens receptacle check 473. Fluid in inlet port 406 vents to ambient atmosphere via the gap between poppet engager 503 and poppet 450.

When nozzle 500 does include a check assembly, the user presses the nozzle check assembly against receptacle check assembly 470. Poppet engager 503 has not yet firmly engaged poppet 450. The nozzle check assembly opens until the nozzle check stops (by virtue of a nozzle check hard stop or a nozzle check spring). The nozzle check then forces receptacle check assembly open. Fluid communication between inlet port 406 and nozzle inner void 502b is now enabled.

Whether or not nozzle 500 includes a check assembly, the user continues to press nozzle 500 against receptacle 400 until poppet engager 503 firmly contacts poppet 450. The user may wait for pressure to equalize. When nozzle 500 includes a check assembly, the pressures fully or partially equalize via the check assembly. It should be appreciated that all check assemblies disclosed herein enable partial and/or full equalization when matched with a reciprocal check assembly and held open for a sufficient amount of time. When nozzle 500 does not include a check assembly, the pressures may equalize as receptacle 400 vents fluid into ambient, but not fully equalize.

As shown in FIG. 11, nozzle main body 501, poppet engager 503, and dispenser 502 extend into receptacle 400. Receptacle packing 460 seals against nozzle main body 501. Eventually, as shown in FIG. 12, main body 501 stops while dispenser 502 and poppet engager 503 further extend into receptacle 400. Main body 501 may be stopped by nozzle outer body 506. For example, and as discussed with reference to nozzle 200, a flange radially outwardly extending from main body 501 may contact an inner shoulder or step of outer body 506 or a flange radially inwardly extending from outer body 506 may contact an outer shoulder or step of main body 501.

A user places nozzle inner void 502b in fluid communication with a source hose or conduit (e.g., by actuating a handle or pressing a button that opens a two-way valve (not shown) disposed in the source hose or conduit or disposed at an end of nozzle 500). Fluid flows from nozzle inner void 502b into receptacle inlet port 406. The fluid pressure in receptacle inlet port 406 may open receptacle first poppet 425. Alternatively (not shown), second stem 445 may contact stopping surface 429 to open first poppet 425. Fluid now flows from inlet port 406 to outlet port 405 and into a destination hose or conduit. Decoupling occurs in the reverse order.

Features or receptacles 300 and 400 may be swapped. More specifically, any feature of receptacle 300 may be added to, or replace, any feature of receptacle 400. Similarly, any feature of receptacle 400 may be added to, or replace, any feature of receptacle 300.

For example, receptacle 300 may be modified: (a) to replace spring seat 302 with valve seat 430, (b) to treat stem 303 as stem 445, (c) to add poppet 425 in the arrangement shown in FIG. 9, (d) to add spring seat 410 as shown in FIG. 9, (e) to reconfigure main body portion 301a into portions 402 and 403, as shown in FIG. 9, and/or (f) to add packing 435, as shown in FIG. 9. One, some, or all of these modifications may be implemented.

As another example, receptacle 400 may be modified: (a) to replace stem 445 with stem 303 (although still arrange stem 303 inside first poppet 425 and valve seat 430, as shown in FIG. 9), (b) to replace poppet 450 with poppet 306, (c) to replace check assembly 470 with check assembly 307, (d) to replace main body portion 404 with main body portion 301b of main body 301, (e) to remove ring 454, and/or (f) to replace packing 462 with packing 305. One, some, or all of these modifications may be implemented.

As another example, features of receptacle 400 above replacement line R-R may be replaced with features of receptacle 300 within box 2 of FIG. 1. Nut 303b may also be added.

FIGS. 13 to 16 illustrate a third receptacle embodiment 700. Receptacle 700 includes a main body 701, a first spring seat 710, a first spring 715, a first stem 720, a first poppet 725, a valve seat 730, a second spring seat 740, a second spring 745, a second stem 750, and a second poppet 760. Portions of at least second stem 750 and second poppet 760 are not cross sectioned in FIG. 13, as is apparent in the isometric view of FIG. 15.

Main body 701 includes a first portion 702 threaded to a second portion 703. Main body 701 defines a partially conical inlet port 701a and a cylindrical outlet port 701b. Second portion 703 includes a flat annular surface 704a and a partially conical surface 704b, which cooperate to define inlet port 701a. Second portion 703 includes a cylindrical surface 704c for engaging an outer circumference of poppet head 761 and a partially conical surface valve seat or sealing surface 704d for sealingly engaging a compressive packing 762 of poppet 760.

First spring seat 710 defines a central internal void 711 for slidably receiving first stem 720. First spring seat 710 defines one or more voids (not shown) enabling fluid flow across first spring seat 710 (e.g., from first spring 715 to outlet 701b). First spring seat 710 may be threaded to main body 701. First spring seat 710 may be stopped against an inner shoulder 712 of main body 701. First spring 715 is directly disposed between first spring seat 710 and first poppet 725. First spring 715 biases first poppet 725 to a closed position.

First stem 720 is secured to first poppet 725 (e.g., threaded or integral). First stem 720 is configured to slide within central internal void 711. First stem includes a step or shoulder 721 configured to stop against first spring seat 710 to arrest longitudinal movement of first poppet 725 toward outlet 701b. First stem 720 defines a central inner blind bore 722 for slidably receiving second stem 750.

First poppet 725 includes a partially conical sealing surface 726 for engaging valve seat 730 when first poppet 725 is in the closed position. First poppet 725 defines a portion of inner blind bore 722. First spring 715 biases first poppet 725 to the closed position. First poppet 725 opens in response to (a) fluid pressure inside valve seat 730 exceeding the biasing force of first spring 715 or (b) second stem 750 contacting a longitudinal end of blind bore 722.

Valve seat 730 includes an outer packing 731, an inner packing 732, and a valve seat body 733. Outer packing 731 is compressed between valve seat 730 and main body 701. Inner packing 732 is retained in valve seat 730 by virtue of major protrusion 732a and minor protrusion 732b. Major protrusion 732a contacts three different first inner surfaces of valve seat 730. Minor protrusion 732b contacts three different second inner surfaces of valve seat 730. Major protrusion 732a is perpendicular with respect to minor protrusion 732b.

When in the closed position, first poppet 725 compressively engages inner packing 732. Valve seat body 733 may be threaded to main body 701. Valve seat body 733 may be fixed with respect to main body 701 by virtue of opposing forces exerted by second spring 745 and outer packing 731. Valve seat 730 defines a cylindrical inner void (not labeled) for receiving first poppet 725, second spring seat 740, and enabling fluid flow across valve seat 730.

Second spring seat 740 may be integral with valve seat 730. Alternatively, second spring seat 740 may rest on an inner shoulder or step (not labeled) of valve seat 730 and thus be retained by virtue of opposing forces from second spring 745 and valve seat 730. Second spring seat 740 defines a central inner void (not labeled) for slidably receiving second stem 750. Second spring seat 740 defines one or more longitudinally extending voids (not shown) for enabling fluid flow across second spring seat 740.

One end of second spring 745 rests on second spring seat 740. An opposing end of second spring seat 745 contacts second poppet 760. Second spring 745 biases second poppet 760 to a closed position. Second stem 750 is secured (e.g., integral or threaded) to second poppet 760. Second stem 750 is slidably received in second spring seat 740, first poppet 725, and first stem 720.

Second poppet 760 includes a head 761, an annular seal or packing 762, and a guide 763. Head 761 may be metallic while annular packing 762 and guide 763 may be polymeric. When second poppet 760 is closed, head 761 engages inner surface 704c of main body 701 and seal 762 engages valve seat or sealing surface 704d of main body 701. Guide 763 forms an annular pocket (not labeled) for receiving second spring 745. Guide 763 includes an outer ring 763a for engaging an inner cylindrical surface of main body to stabilize and longitudinally align second poppet 760 when second poppet 760 is in the closed position and when second poppet 760 is in an open position. Although not illustrated as such in FIG. 13, guide 763 is annular and symmetrical about its longitudinal axis.

Figure 16:
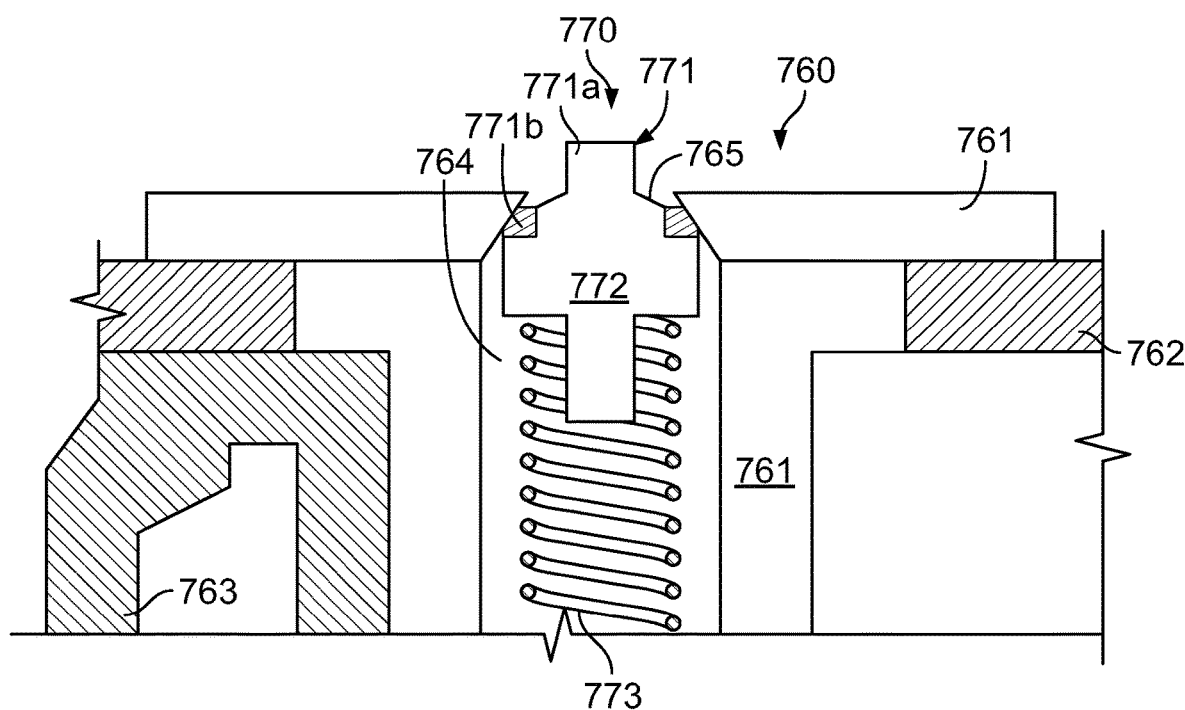
FIG. 16 is a schematic cross-sectional view of a check assembly for the third receptacle.

An alternate embodiment of second poppet 760 is schematically shown in FIG. 16. Second poppet 760 defines a central inner blind bore 764 for receiving a check assembly 770. One or more voids (e.g., unshown cross drillings 480) enable fluid communication between second spring 745 and blind bore 764. Check assembly 770 includes a check 771, a spring stop 772, and a check spring 773. One end of check spring 773 contacts head 761. An opposing end of check spring 773 contacts spring stop 772 to bias check 771 to a closed position. Check 771 includes a head 771a outwardly protruding from poppet head 761. Check 771 includes an annular packing 771b configured to contact an inner valve seat or sealing surface 765 of second poppet 760. As with FIGS. 13 and 15, FIG. 16 only shows one side of guide 763, although in practice, guide 763 may be annular and symmetrical about its longitudinal axis.

Check assembly 770 is configured to engage a reciprocal check assembly (not shown) of a nozzle. After an outer packing of the nozzle seals against main body surface 704a, 704b, and/or 704c, the reciprocal check assembly forces receptacle check assembly 770 open, thus enabling pressure equalization between the nozzle and receptacle 700. After pressure equalization has occurred, the nozzle pushes poppet head 761 toward outlet 701b and dispenses fluid into receptacle 700. Under the pressure of fluid or due to second stem 750 contacting the end of blind bore 722, first poppet 725 opens, enabling fluid to flow from the nozzle to outlet 701b.

The operations discussed below may apply to (a) nozzle 200 and receptacle 300, (b) nozzle 500 and receptacle 400, and/or (c) receptacle 700.

As previously discussed, a fluid source assembly may include (a) a source tank, (b) nozzle 200, 500, and (c) a hose or conduit extending between the source tank and nozzle. The fluid source assembly may further include a pump disposed upstream of the nozzle.

A user may manually activate the pump to pressurize the hose or conduit with fluid from the source tank. The pump may be automatically activated, by a controller, when one or more sensors determine that the nozzle probe has translated a sufficient or predetermined length into receptacle 300, 400. The one or more sensors are thus configured to determine an amount of extension of nozzle probe into the receptacle. The controller may delay the pump for a set amount of time (e.g., three seconds) after the nozzle reaches the appropriate position within the receptacle. Alternatively or in addition, a controller may only enable activation of the pump once the above-described distance and/or time conditions have been satisfied. The controller may controller the force applied by force originator 504a to lever 206, 504. With respect to the second embodiment (i.e., nozzle 500 and receptacle 400), the controller may disable withdrawal of nozzle 500 until first poppet 425 is detected, by one or more sensors, to be closed.

Nozzle 200, 500 may include various sensors and controls. The nozzle may be electrically grounded, enabling components thereof such as the poppet engager and/or the outer walls of nozzle to electrically ground the receptacle. The controller may confirm, with reference to one or more sensors, that the nozzle and receptacle have been electrically grounded before allowing the check assemblies of the nozzle and/or receptacle to move from their closed positions. The controller may confirm, with reference to one or more sensors, that the nozzle and receptacle have been electrically grounded before allowing the poppet engager to contact the poppet and/or before allowing the checks to touch. Leak sensors may be disposed in the nozzle to detect an undesirable flow of fluid prior to engagement with the receptacle. Leak sensors disposed around the nozzle or receptacle may detect fluid leaking past any of the annular seals.

The nozzle may also include cycle count and service sensors such as RFID tags that enable the controller to track how many times the nozzle has engaged a receptacle. The receptacle may include a similar feature. The nozzle may include a solenoid or pneumatically operated lock to mechanically actuate the link or lever.

With reference to FIG. 17, a filling handle 800 is connected to a source hose or conduit 850, which is connected to a source tank (not shown). Filling handle 800 is coupled with receptacle 860, which is connected to tank 870 via a hose or conduit (not shown). Receptacle 860 includes a main body 861. Handle 800 includes a nozzle 801, an arm 802, a handle 803, LEDs 804, and buttons 805. Nozzle 801 may be any of the above-described nozzles. Receptacle 860 may be any of the above-described receptacles. Only the outer body of nozzle 801 is shown. Arm 802 is mechanically connected with the nozzle link or lever and is also mechanically connected with a motor configured to drive arm 802. Nozzle outer body may be an integrated grounding connection.

LEDs 804 indicate a status of engagement between the nozzle and the receptacle. For example, a first lighting pattern may indicate a pressure equalization process occurring between nozzle and receptacle check assemblies. A second lighting pattern may indicate the nozzle probe contacting the receptacle poppet. A third lighting pattern may indicate the nozzle probe being fully extended. A fourth lighting pattern may indicate fluid flow occurring between the nozzle and the receptacle. A fifth lighting pattern may indicate that the receptacle poppet has closed and that the nozzle is ready to be removed from the receptacle.

A first button 805a may activate the pump (subject to the above-described conditions). A second button 805b may deactivate the pump. A third button 805c may cause the motor to move the arm 802 toward the receptacle to extend the nozzle (subject to the above-described conditions). A fourth button 805d may cause the motor to withdraw the nozzle (subject to the above-described conditions).

Figure 18:
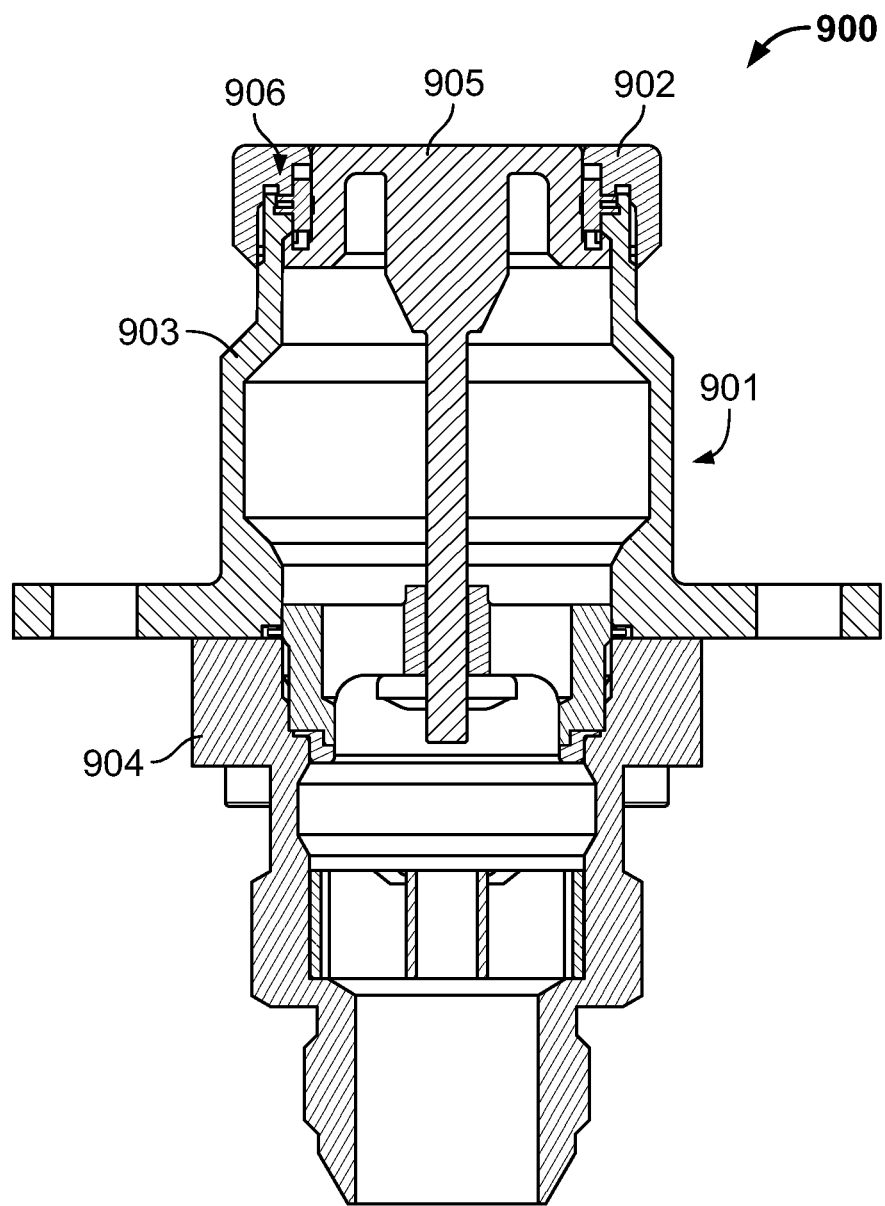
FIG. 18 is a cross-sectional view of a receptacle.

FIGS. 18 to 25 illustrate an alternative embodiment of a packing. With reference to FIG. 18, receptacle 900 (which may correspond to any receptacle disclosed herein, including receptacles 300 and 400) includes (a) a main body 901 having a first portion 902, a second portion 903, and a third portion 904, (b) a longitudinally moveable or sliceable poppet 905, and (c) a packing 906. Packing 906 serves as a valve seat for poppet 905.

Figure 19:
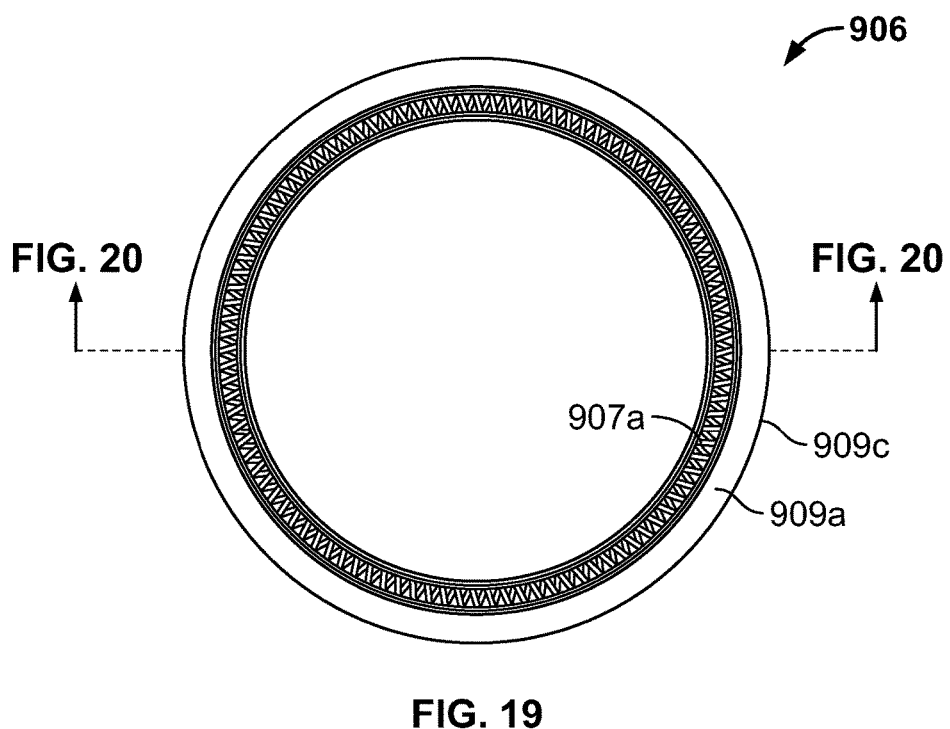
FIG. 19 is a top plan view of a packing of the receptacle.
Figure 20:
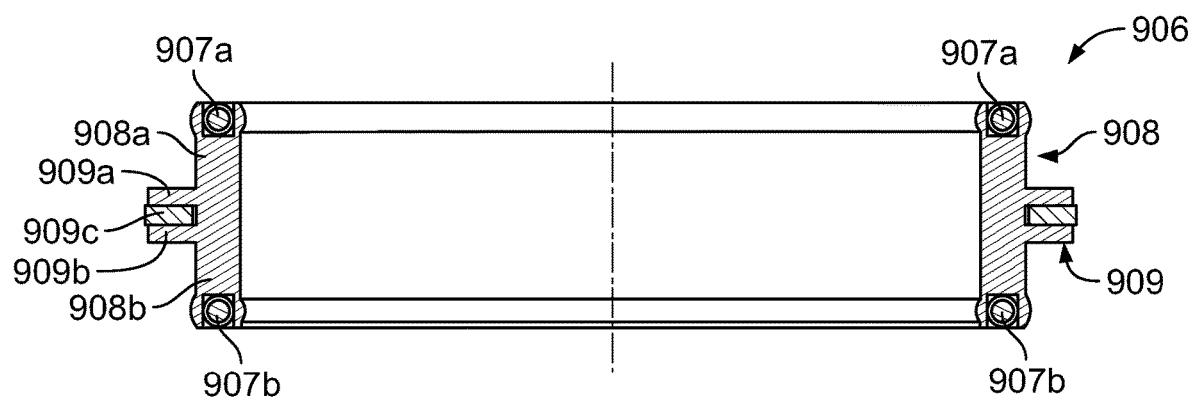
FIG. 20 is a cross sectional view of the packing.

With reference to FIGS. 19 and 20, packing 906 includes a first circumferential spring 907a, a second circumferential spring 907b, a cylindrical spring housing 908, and a ringed protrusion or projection 909. Springs 907a, 907b may be (a) neutral and/or energized, or (b) radially inwardly biased and/or energized, or (c) radially outwardly biased and/or energized. When neutral, springs 907a, 907b may both radially inwardly bias packing material and radially outwardly bias packing material.

Protrusion 909 includes a first ring 909a, a second ring 909b, and a third ring 909c. First and second rings 909a, 909b may be integral with spring housing 908. Third ring 909c may be non-integral with first and second rings 909a or may be fully integral. As shown in FIG. 19, third ring 909c may slightly radially outwardly protrude from an annular groove (not labeled) defined between first and second rings 909a, 909b, in which third ring 909c is seated. Protrusion may be located equidistant from each spring 907a, 907b. Protrusion may be located closer to one spring 907a, 907b than the other spring 907b, 907a. Spring housing 908 and retainer 909 may be packing material (e.g., polymer).

Spring housing 908 may define two three-sided annular grooves or pockets (not labeled), which receive first and second springs 907a, 907b. As with all circumferential springs disclosed herein, one side of each spring 907a, 907b may be exposed (i.e., at least partially exposed) by the annular grooves or pockets to enable fluid flow into springs 907a, 907b. This fluid flow further energizes springs 907a, 907b, enhancing compression provided by springs 907a, 907b. Each spring 907a, 907b may have a thickness (the thickness being the difference between the outer radius of each spring and the inner radius of each spring) greater than a thickness of the three-sided grooves or pockets before insertion of springs 907a, 907b therein to generate an interference fit between springs 907a, 907b and the grooves or pockets.

With reference to FIGS. 21 to 25, portions 902 and 903 of receptacle main body 901 are threaded together to compress protrusion 909. Compression of first and second rings 909a, 909b retains spring housing 908 in place. Compression of third ring 909c induces radial expansion of third ring 909c, thus generating an a first outer circumferential seal 943 between main housing portion 903 and packing 906. The interference fit between springs and the grooves or pockets generates second and third outer circumferential seals 944 and 945. Similarly, the inward bias of springs 907*a*, 907*b* and/or the interference fit generates first and second inner circumferential seals 941, 942 between packing 906 and poppet 905.

FIGS. 21 to 25 illustrate a coupling process, including first, second, third, and fourth stages 970*a*, 970*b*, 970*c*, 970*d* between receptacle 900 and a generic nozzle 960 having a probe 961. A decoupling process occurs in the reverse order. At first stage 970*a*, an outer body (not shown) of nozzle 960 is latched to receptacle 900. Probe 961 begins touching receptacle poppet 905. Both inner circumferential seals 941, 942 bear on poppet 905. At second stage 970*b*, probe 961 has pushed poppet 905 a small longitudinal distance. Poppet 905 is still closed because poppet 905 is engaged with packing 906 via first inner seal 941. Poppet is no longer engaged with second inner seal 942.

At third stage 970*c*, probe 961 has pushed poppet 905 a medium longitudinal distance. Poppet 905 is still closed because poppet 905 is engaged with packing 906 via first inner seal 941. Second inner seal 942 has now engaged probe 961, thus preventing fluid from leaking between main body 901 and probe 961. At fourth stage 970*d*, poppet 905 is no longer engaged with packing 906 and is thus open. Nozzle 961 has pushed poppet 905 a large distance. First inner seal 941 is absent. At fifth stage 970*e*, both first and second inner seals 941, 942 are engaged with probe 961. Probe 961 has pushed poppet 905 a maximum distance. A user may open nozzle 961 to flow fluid F into receptacle 900. Decoupling occurs in the reverse order.

Figure 21:
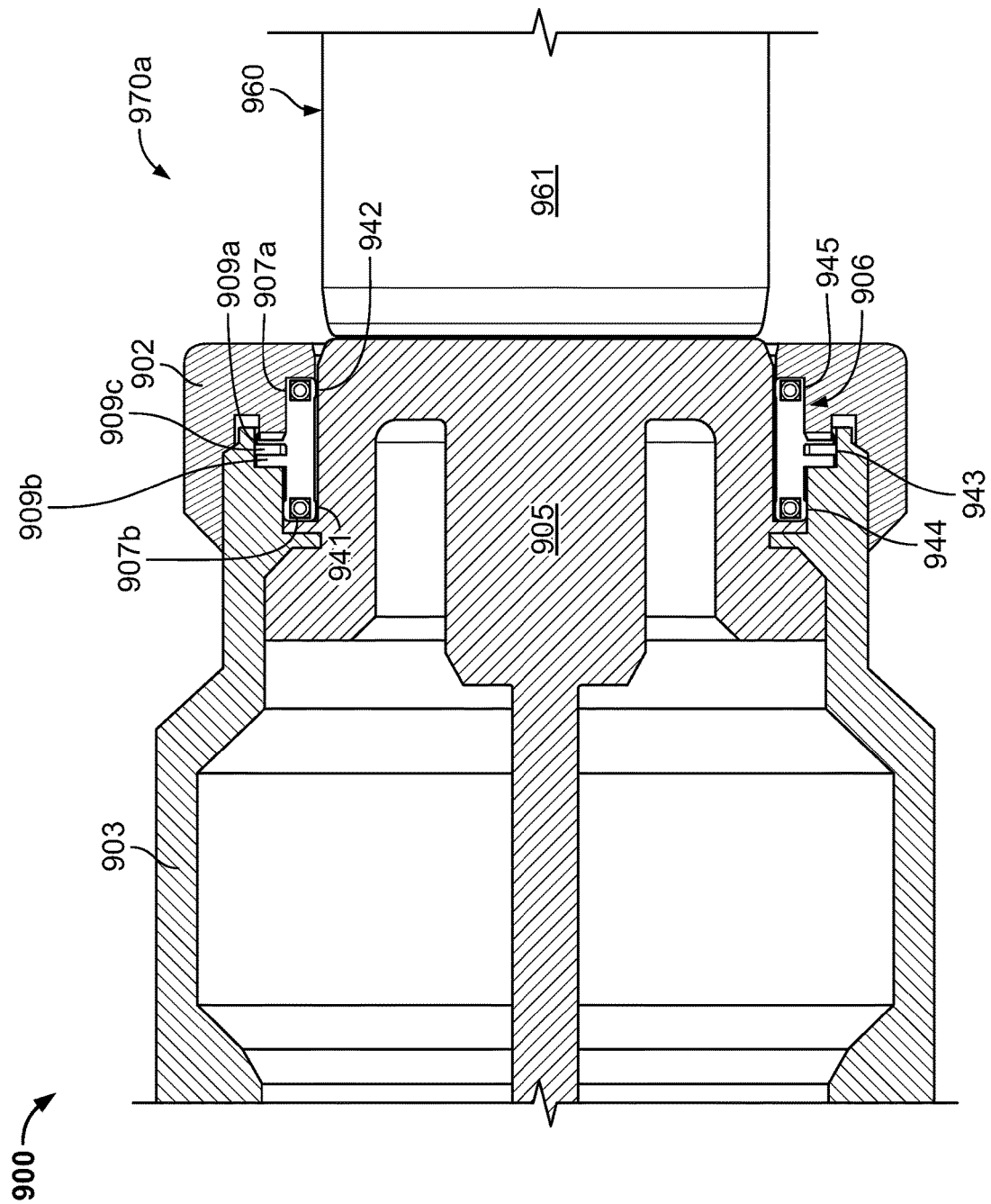
FIGS. 21 to 25 are cross sectional views of the receptacle coupling with a probe of a nozzle.
Figure 22:
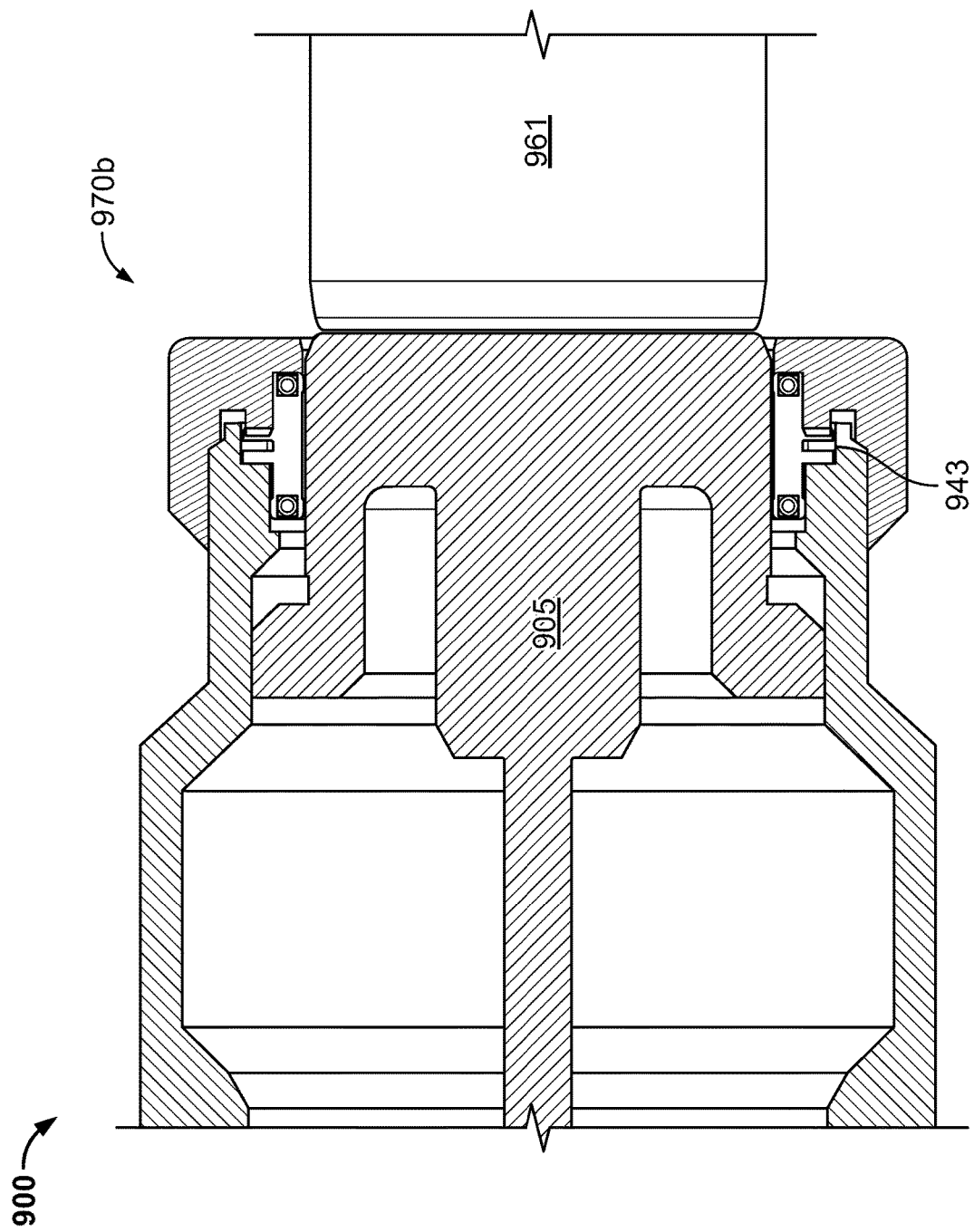
Figure 23:
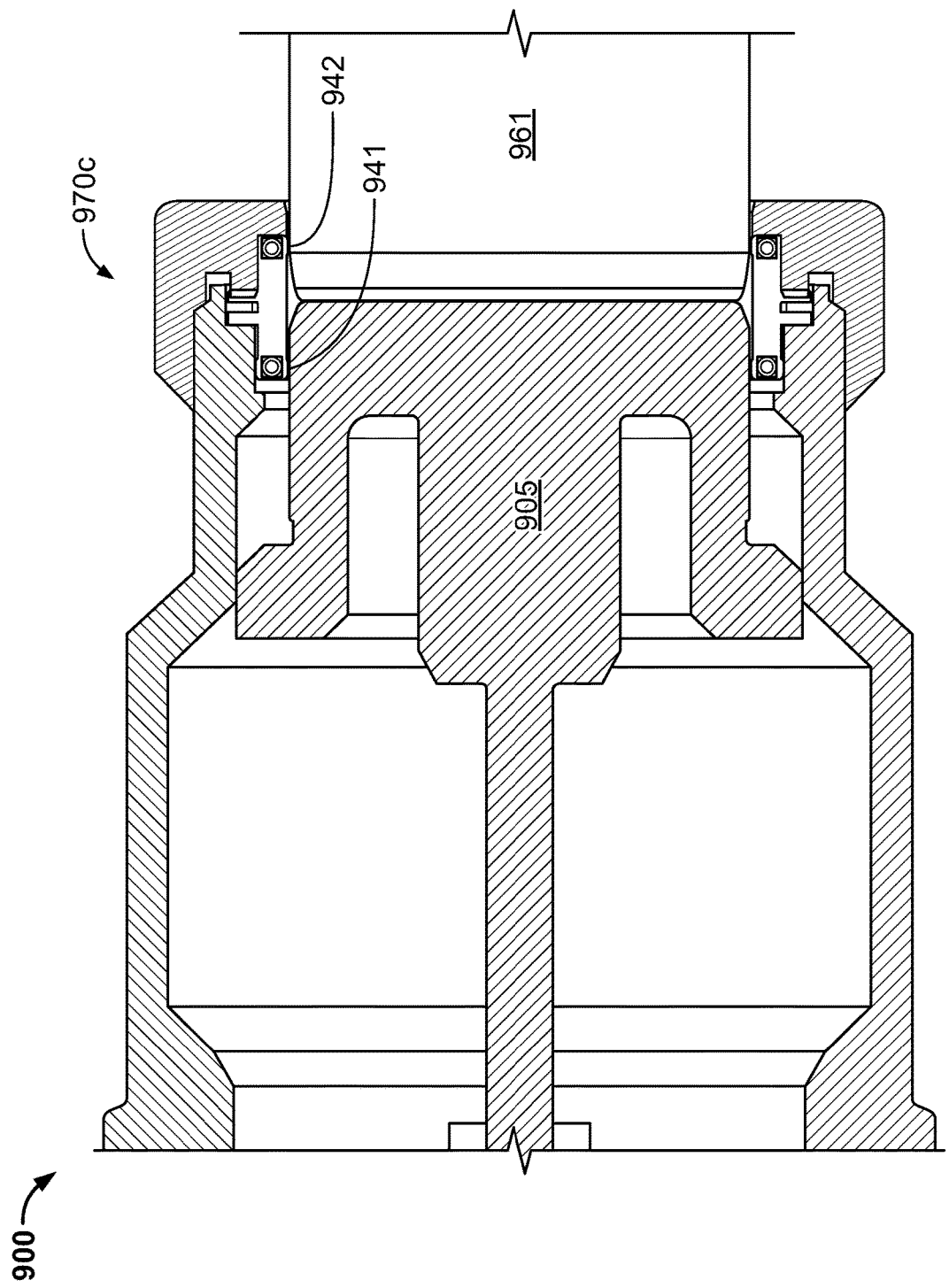
Figure 24:
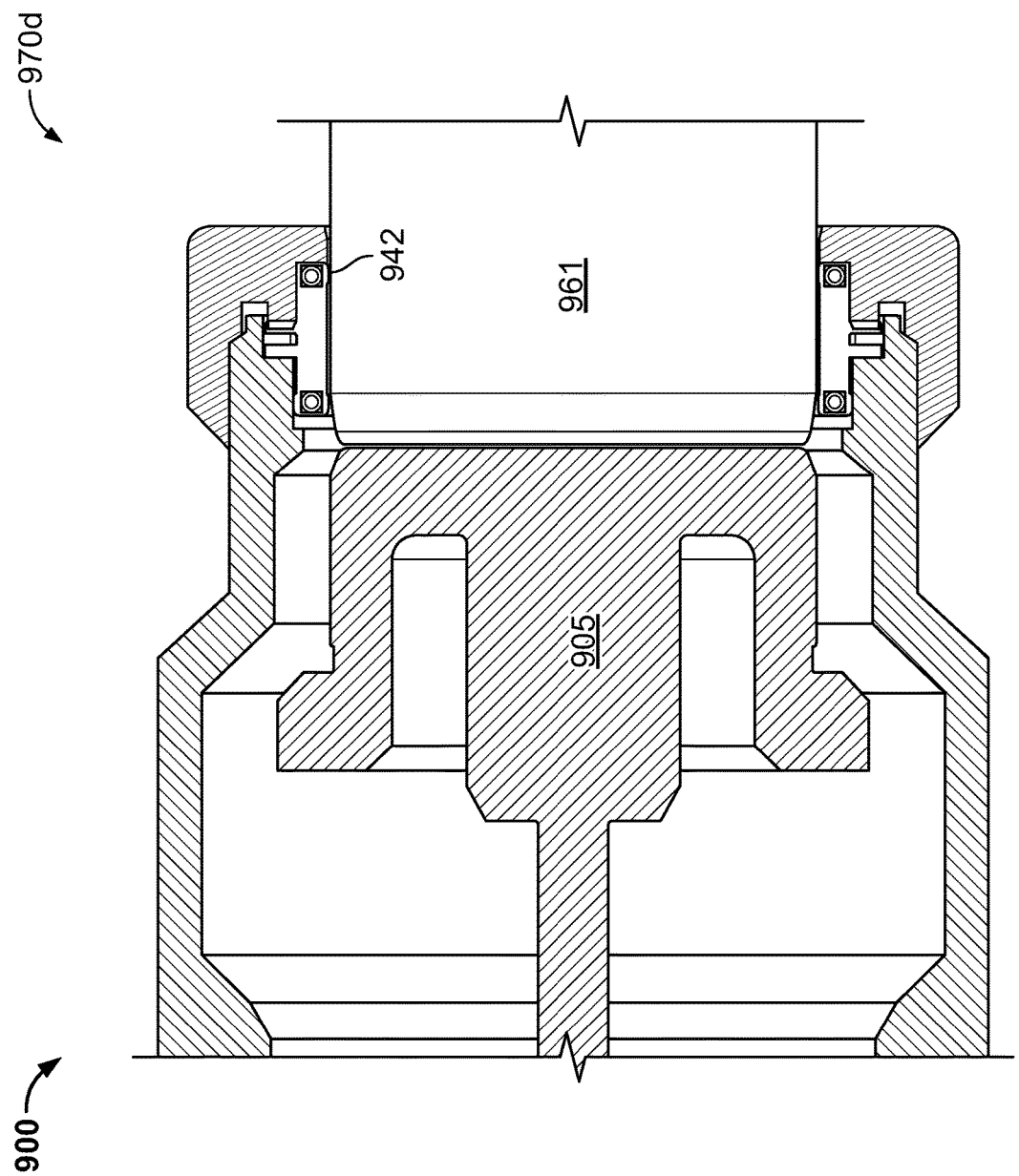
Figure 25:
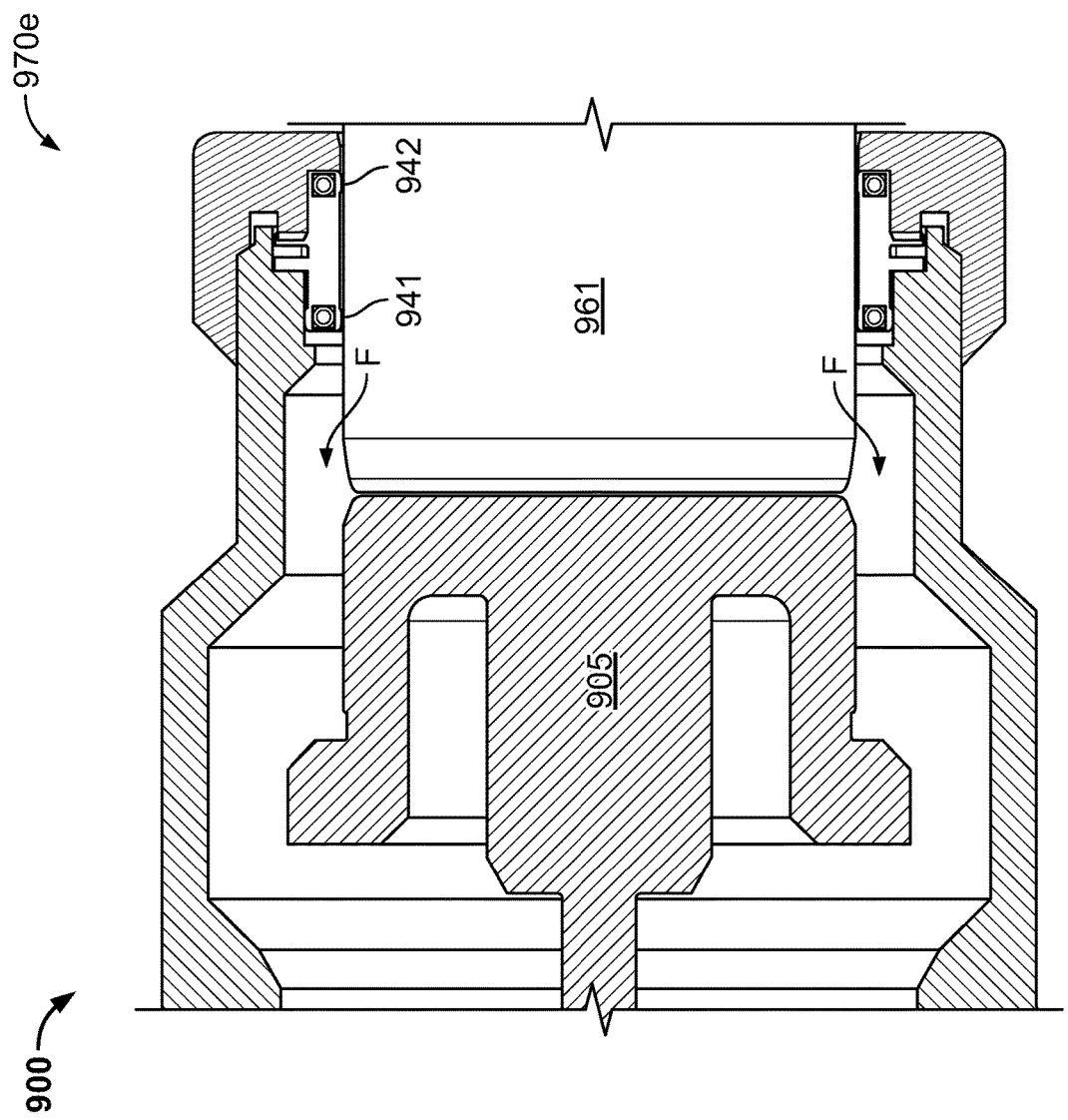

Packing 906 may replace some or all of the following packings: packing 204, packing 305, packing 460, packing 505. Packing 906 may only replace packings configured to contact both a nozzle and a receptacle. When packing 906 replaces one of the previously described packings, springs 907*a*, 907*b* may be (a) neutral and/or energized, (b) radially inwardly biased and/or energized, or (c) radially outward biased and/or energized. As stated above, when springs 907*a*, 907*b* are neutral and/or energized, springs 907*a*, 907*b* may outwardly bear (due to the interference fit) on the groove or slot. When packing 906 replaces one of the previously described packings, the features retaining the packing (e.g., the main bodies, the probes, etc.) may be reconfigured to retain packing 906. For example, main body portions 301*a*, 301*b* may be reconfigured to grip protrusion 909 in the manner shown FIG. 21. Alternatively or in addition, when packing 906 replaces one of the previously described packings, the poppet (e.g., poppet 306) may be reconfigured, in conjunction with the features retaining the packing (e.g., the main bodies) to enable the poppet to contact a longitudinal end of packing 906 when the poppet is fully closed, as is shown in FIG. 21 where poppet 905 longitudinally contacts packing 906 at spring 907*b*. Although such a longitudinal contact feature may advantageous, it is not especially preferred.

It should thus be appreciated that the present application discloses the following embodiments.

Disclosed is a nozzle for dispensing fluid, the nozzle being configured to occupy a retracted position and an extended position, the nozzle comprising: a main body; a probe comprising a flat annular surface and a check sealing surface, the probe defining an inner void, a check void, and one or more passageways leading from the inner void to the check void; and a check assembly disposed in the check void, the check assembly comprising a check and a spring, the spring biasing the check assembly to a closed position where the check sealingly engages the check sealing surface, wherein when the check assembly is in the closed position, the check longitudinally extends beyond the flat annular surface.

According to some embodiments, the probe comprises a poppet engager and a spring seat and the flat annular surface has an outer diameter equal to an outer diameter of the nozzle.

According to some embodiments, the check assembly comprises a seal assembly annularly disposed about the check.

According to some embodiments, the seal assembly is disposed beyond the flat annular surface.

According to some embodiments, the check assembly is in the closed position, the check extends beyond the seal assembly.

According to some embodiments, when the nozzle is in the retracted position, the main body circumferentially surrounds a first portion of the probe.

According to some embodiments, when the nozzle is in the extended position, the main body circumferentially surrounds a second portion of the probe, the second portion being less than the first portion.

According to some embodiments, the nozzle includes an outer body comprising one or more latches configured to bind the outer body to a receptacle, wherein the main body is moveable with respect to the outer body.

According to some embodiments, the nozzle transitions between the retracted position and the extended position, the main body translates a first distance and the probe translates a second distance, the second distance exceeding the first distance.

According to some embodiments, one of the main body and the probe comprises one or more flexible tabs configured to engage one or more recesses defined in the other of the main body and the probe.

According to some embodiments, the one or more flexible tabs are configured to occupy an engaged position where the one or more flexible tabs occupy the one or more recesses and a disengaged position where the one or more flexible tabs do not occupy the one or more recesses.

According to some embodiments, when the one or more flexible tabs are in the engaged position, the one or more flexible tabs cause the main body and the probe to translate as a common unit and wherein the nozzle is configured such that the one or more flexible tabs disengage before the nozzle reaches the extended position.

According to some embodiments, an outer perimeter of the probe at least partially defines one or more outlet voids, each of the one or more outlet voids being in constant fluid communication with the inner void, the main body covering each of the one or more outlet voids when the nozzle is in the retracted position and at least a portion of the one or more outlet voids protruding from the main body when the nozzle is in the extended position.

According to some embodiments, the nozzle is configured such that as the nozzle moves from the retracted position to the extended position, the main body and the probe move together as a common unit until reaching a first distance and after the first distance, the probe moves with respect to the main body.

According to some embodiments, the probe comprises an annular protrusion disposed in a center of the flat annular surface and the check assembly comprises a seal assembly disposed on the annular protrusion.

According to some embodiments, an outer diameter of the seal assembly exceeds an outer diameter of the annular protrusion.

According to some embodiments, the nozzle includes an annular packing disposed in an outer groove defined in the probe, the annular packing comprising a packing material and circumferential spring disposed in a groove defined in the packing material, the circumferential spring biasing the packing material radially outward toward the main body.

According to some embodiments, the probe comprises one or more fasteners, the one or more fasteners causing the probe to compress at least a portion of the annular packing.

According to some embodiments, when the nozzle is in the retracted position, the annular packing is compressed between the probe and the main body and when the nozzle is in the extended position, the annular packing is not compressed by the main body.

According to some embodiments, the nozzle includes an annular packing disposed in an outer groove defined in the probe, the annular packing comprises a cylindrical spring housing defining two annular spring slots and a central inner void, a ringed protrusion extending from the cylindrical spring housing, and two circumferential springs disposed in the annular spring slots.

According to some embodiments, the nozzle includes a packing for sealing a fluid conduit, the packing comprising: a packing housing defining a longitudinally extending inner void and two annular spring grooves; a ringed projection extending from the packing housing; two circumferential springs disposed in the annular spring grooves.

Disclosed is a receptacle comprising: a main body defining a main inner void; a spring seat disposed in the main body, the spring seat defining a central void; a stem at least partially disposed in the central void and at least partially disposed in the main inner void; a poppet connected to the stem, the poppet comprising an inner check sealing surface and defining a central inner check void; a spring disposed between the spring seat and the poppet, the spring at least partially occupying the main inner void, the spring biasing the poppet to a closed position; a check assembly at least partially disposed in the inner check void, the check assembly comprising a check and a check spring, the check spring biasing the check toward a closed position where the check engages the inner check sealing surface, the check protruding from the poppet when the check is in the closed position.

According to some embodiments, the receptacle includes a packing for sealing a fluid conduit, the packing comprising: a packing housing defining a longitudinally extending inner void and two annular spring grooves; a ringed projection extending from the packing housing; two circumferential springs disposed in the annular spring grooves.

According to some embodiments, the receptacle includes an annular packing, the annular packing comprising packing material and a circumferential spring housed in the packing material, the annular spring biasing the packing material radially inward.

According to some embodiments, when the poppet is in the closed position, the packing is compressed between the poppet and the main body.

According to some embodiments, the annular packing comprises at least two circumferential springs housed in the packing material.

According to some embodiments, when the poppet is an open position, the packing does not contact the poppet.

According to some embodiments, the poppet comprises a flat annular end surface.

According to some embodiments, the poppet defines a first central void extending to the flat annular end surface.

According to some embodiments, the poppet defines a second central void extending between the inner check void and the first central void.

According to some embodiments, when the check is in an open position, the first central void, the second central void, and the main inner void are in fluid communication.

Disclosed is a method of coupling a nozzle with a receptacle, the nozzle being configured to occupy a retracted position and an extended position.

According to some embodiments, the nozzle includes: a nozzle main body; a nozzle probe comprising a nozzle flat annular surface and a nozzle check sealing surface, the nozzle probe defining a nozzle inner void, a nozzle check void, and one or more nozzle passageways leading from the nozzle inner void to the nozzle check void; a nozzle check assembly disposed in the nozzle check void, the nozzle check assembly comprising a nozzle check and a nozzle spring, the nozzle spring biasing the nozzle check assembly to a closed position where the nozzle check sealingly engages the nozzle check sealing surface, wherein when the nozzle check assembly is in the closed position, the nozzle check longitudinally extends beyond the nozzle flat annular surface.

According to some embodiments, the receptacle includes: a receptacle main body defining a receptacle main inner void; a receptacle spring seat disposed in the receptacle main body, the receptacle spring seat defining a receptacle central void; a receptacle stem at least partially disposed in the receptacle central void of the receptacle spring seat, the receptacle stem being at least partially disposed in the receptacle main inner void; a receptacle poppet connected to the receptacle stem, the receptacle poppet comprising a receptacle inner check sealing surface and defining a receptacle central inner check void; a receptacle spring disposed between the receptacle spring seat and the receptacle poppet, the receptacle spring at least partially occupying the receptacle main inner void, the receptacle spring biasing the receptacle poppet to a closed position; a receptacle check assembly at least partially disposed in the receptacle inner check void, the receptacle check assembly comprising a receptacle check and a receptacle check spring, the receptacle check spring biasing the receptacle check toward a closed position where the receptacle check engages the receptacle inner check sealing surface, the receptacle check protruding from the receptacle poppet when the receptacle check is in the closed position.

According to some embodiments, method includes: equalizing pressure between the nozzle inner void and the receptacle main inner void by pressing the nozzle check against the receptacle check to open the nozzle check and the receptacle check; extending the nozzle into the receptacle such that the receptacle main body surrounds at least a portion of the nozzle probe; flowing fluid from the nozzle inner void into the receptacle main inner void.

According to some embodiments, the method includes waiting for the pressure between the nozzle inner void and the receptacle main inner void to equalize before extending the nozzle into the receptacle.

According to some embodiments, the step of inserting the nozzle into the receptacle comprises pressing the nozzle flat annular surface of the nozzle probe against the receptacle poppet.

According to some embodiments, the receptacle poppet comprises a receptacle flat annular surface and the receptacle poppet defines a receptacle first void extending to the receptacle flat annular surface.

According to some embodiments, the nozzle check assembly comprises a nozzle check seal.

According to some embodiments, the method comprises inserting the nozzle check seal into the receptacle first void prior to opening the nozzle check and prior to opening the receptacle check.

According to some embodiments, the step of equalizing pressure between the nozzle inner void and the receptacle main inner void by pressing the nozzle check against the receptacle check to open the nozzle check and the receptacle check comprises: opening the nozzle check prior to opening the receptacle check.

According to some embodiments, the receptacle comprises a receptacle annular packing compressed between the receptacle main body and the receptacle poppet when the receptacle poppet is in the closed position, wherein when the nozzle is in the extended position, the receptacle annular packing is compressed between the nozzle main body and the receptacle main body.

According to some embodiments, the method further includes causing the receptacle annular packing to be compressed by the receptacle main body, the receptacle poppet, and the nozzle main body for at least a moment in time.

According to some embodiments, the receptacle comprises a receptacle additional poppet and a receptacle additional spring, the receptacle additional poppet being disposed downstream of the receptacle poppet, the receptacle additional spring biasing the receptacle additional poppet to a closed position.

According to some embodiments, the method includes opening the receptacle additional poppet by pressurizing the receptacle main inner void.

According to some embodiments, the method includes opening the receptacle additional poppet by causing the receptacle stem to contact a receptacle stop, the receptacle stop being connected to the receptacle additional poppet.

According to some embodiments, the method includes: determining, via one or more sensors in electrical communication with a controller, when the nozzle reaches the extended position; via the controller, automatically causing fluid to flow from the nozzle into the receptacle when the controller determines that the nozzle has reached the extended position. The controller may be disposed in the nozzle.

According to some embodiments, each of the nozzle and the receptacle include a packing for sealing a fluid conduit, the packing comprising: a packing housing defining a longitudinally extending inner void and two annular spring grooves; a ringed projection extending from the packing housing; two circumferential springs disposed in the annular spring grooves.

Disclosed is a receptacle for receiving fluid, the receptacle comprising: a main body, one end of the main body defining an outlet port, an opposing end of the main body defining an inner void, and the main body comprising an inner sealing surface; a first poppet disposed in the main body, the first poppet comprising an annular seal; a first spring seat disposed in the main body; a first spring disposed between the first spring seat and the first poppet and biasing the first poppet toward a closed position where the annular seal engages the inner sealing surface; wherein, when the first poppet is in the closed position, the first poppet defines at least a portion of the inner void.

According to some embodiments, the receptacle includes a packing for sealing a fluid conduit, the packing comprising: a packing housing defining a longitudinally extending inner void and two annular spring grooves; a ringed projection extending from the packing housing; two circumferential springs disposed in the annular spring grooves.

According to some embodiments, the inner void is exposed to ambient atmosphere.

According to some embodiments, the inner void is annular.

According to some embodiments, the inner void is partially conical.

According to some embodiments, the receptacle further includes a check assembly centrally disposed in the first poppet, the check assembly comprising a check and a check spring, the check spring biasing the check to closed position where the check contacts an inner surface of the first poppet.

According to some embodiments, when the check is in the closed position, the check protrudes from the first poppet into the inner void.

According to some embodiments, the receptacle further includes: a second spring seat disposed in the main body; a valve seat; a second poppet; a second spring disposed between the second spring seat and the second poppet, the second spring biasing the second poppet to a closed position where the second poppet contacts the valve seat.

According to some embodiments, the receptacle includes a stem connected to the first poppet and extending through the valve seat, the first spring seat, and the second poppet.

According to some embodiments, the main body defines a main inner void in which the first spring is disposed, the first poppet defining one or more passageways fluidly communicating the main inner void with the check spring.

Disclosed is an assembly comprising a nozzle coupled with a receptacle; the nozzle being configured to occupy a retracted position and an extended position.

According to some embodiments, the nozzle includes: a nozzle main body; a nozzle probe comprising a nozzle flat annular surface and a nozzle check sealing surface, the nozzle probe defining a nozzle inner void, a nozzle check void, and one or more nozzle passageways leading from the nozzle inner void to the nozzle check void; a nozzle check assembly disposed in the nozzle check void, the nozzle check assembly comprising a nozzle check and a nozzle spring, the nozzle spring biasing the nozzle check assembly to a closed position where the nozzle check sealingly engages the nozzle check sealing surface, wherein when the nozzle check assembly is in the closed position, the nozzle check longitudinally extends beyond the nozzle flat annular surface.

According to some embodiments, the receptacle includes: a receptacle main body defining a receptacle main inner void; a receptacle spring seat disposed in the receptacle main body, the receptacle spring seat defining a receptacle central void; a receptacle stem at least partially disposed in the receptacle central void of the receptacle spring seat, the receptacle stem being at least partially disposed in the receptacle main inner void; a receptacle poppet connected to the receptacle stem, the receptacle poppet comprising a receptacle inner check sealing surface and defining a receptacle central inner check void; a receptacle spring disposed between the receptacle spring seat and the receptacle poppet, the receptacle spring at least partially occupying the receptacle main inner void, the receptacle spring biasing the receptacle poppet to a closed position; a receptacle check assembly at least partially disposed in the receptacle inner check void, the receptacle check assembly comprising a receptacle check and a receptacle check spring, the receptacle check spring biasing the receptacle check toward a closed position where the receptacle check engages the receptacle inner check sealing surface, the receptacle check protruding from the receptacle poppet when the receptacle check is in the closed position.

According to some embodiments, the assembly is configured to: equalize pressure between the nozzle inner void and the receptacle main inner void by pressing the nozzle check against the receptacle check to open the nozzle check and the receptacle check; flow fluid from the nozzle inner void into the receptacle main inner void, upon extension of the nozzle into the receptacle such that the receptacle main body surrounds at least a portion of the nozzle probe.

According to some embodiments, each of the nozzle and the receptacle include a packing for sealing a fluid conduit, the packing comprising: a packing housing defining a longitudinally extending inner void and two annular spring grooves; a ringed projection extending from the packing housing; two circumferential springs disposed in the annular spring grooves.

Disclosed is a packing for sealing a fluid conduit, the packing comprising: a packing housing defining a longitudinally extending inner void and two annular spring grooves; a ringed projection extending from the packing housing; two circumferential springs disposed in the annular spring grooves.

According to some embodiments, each of the circumferential springs has a longitudinal axis collinear with a longitudinal axis of the packing housing.

According to some embodiments, the packing housing only partially surrounds each of the circumferential springs such that each of the circumferential springs is exposed to fluid located outside of the packing.

According to some embodiments, the ringed projection comprises a first ring, a second ring, and a third ring, the first and second rings being integral with the packing housing.

According to some embodiments, the third ring is non-integral with the packing housing.

According to some embodiments, the first and second rings form an annular groove for the third ring and the third ring is disposed in the annular groove.

According to some embodiments, the third ring protrudes from the annular groove.

According to some embodiments, each of the circumferential springs inwardly bias a portion of the packing housing toward the inner void and outwardly bias a portion of the packing housing away from the inner void.

According to some embodiments, the packing housing and the ringed projection comprise a flexible polymer and each of the circumferential springs comprise a metal.

The packing may be disposed in any of the above-described nozzles and receptacles.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A nozzle for dispensing fluid, the nozzle comprising:
   a main body; and
   a probe slidably disposed in the main body, the probe comprising:
   a probe body defining a check sealing surface and a check void, and
   a check assembly at least partially disposed in the check void, the check assembly comprising a check configured to move relative to the main body and the probe body; and
   a spring configured to bias the check to sealingly engage the check sealing surface of the probe body.

2. The nozzle of claim 1, wherein the probe body comprises a spring seat and a poppet engager coupled to the spring seat.

3. The nozzle of claim 1, wherein the probe further comprises an annular seal disposed about the check.

4. The nozzle of claim 3, wherein the check is configured to extend beyond the annular seal when the check assembly is in a closed position.

5. The nozzle of claim 1, wherein the main body is configured to circumferentially surround a first portion of the probe when the nozzle is in a retracted position and a second portion of the probe when the nozzle is in an extended position, the second portion being less than the first portion.

6. The nozzle of claim 5, wherein, to transition the nozzle between the retracted position and the extended position, the main body is configured to translate a first distance and the probe is configured to translate a second distance, the second distance exceeding the first distance.

7. The nozzle of claim 6, wherein the main body and the probe are configured to move together as a common unit while traveling the first distance, wherein the probe is configured to extend beyond the main body after the first distance is traveled.

8. The nozzle of claim 1, further comprising an outer body comprising one or more latches configured to bind the outer body to a receptacle, wherein the main body is moveable with respect to the outer body.

9. The nozzle of claim 1, wherein the probe further defines an inner void and one or more passageways leading from the inner void to the check void.

10. The nozzle of claim 9, wherein the probe at least partially defines one or more outlet ports, wherein each of the one or more outlet ports are in constant fluid communication with the inner void, wherein the main body is configured to cover the one or more outlet ports when the nozzle is in an retracted position and at least partially expose the one or more outlet ports when the nozzle is in an extended position.

11. The nozzle of claim 1, further comprising an annular packing disposed in an outer groove of the probe, wherein the annular packing comprises a packing material and a circumferential spring disposed in a second groove defined in the packing material, wherein the circumferential spring is configured to bias the packing material radially outward toward the main body.

12. The nozzle of claim 11, wherein the probe comprises one or more fasteners configured to cause the probe to compress at least a portion of the annular packing.

13. The nozzle of claim 11, wherein the annular packing is configured to be compressed between the probe and the main body when the nozzle is in an retracted position.

14. The nozzle of claim 1, further comprising an annular packing disposed in an outer groove of the probe, wherein the annular packing comprises:
   a cylindrical spring housing that defines a plurality of annular spring slots and a central inner void;
   a ringed protrusion extending from the cylindrical spring housing; and
   a plurality of springs, each of which is disposed in a respective one of the plurality of annular spring slots.

15. A nozzle for dispensing fluid, the nozzle comprising:
a main body;
 a probe defining a check sealing surface and configured to slide within and at least partially beyond the main body; and
 a check assembly comprising a check configured to move relative to the main body and the probe, and a spring configured to bias the check to sealingly engage the check sealing surface in a closed position.

16. The nozzle of claim 15, wherein the probe further comprises a seal through which the check is configured to extend, wherein the check is configured to extend beyond the seal when the check assembly is in the closed position.

17. The nozzle of claim 15, wherein the nozzle is configured to transition between a retracted position and an extended position.

18. The nozzle of claim 17, wherein, to transition between the retracted position and the extended position, the main body and the probe are configured to travel a first distance together as a common unit and the probe is configured to extend beyond the main body after the first distance is traveled.

19. The nozzle of claim 15, wherein the probe at least partially defines one or more window ports for fluid flow, wherein the main body is configured to cover the one or more window ports when the nozzle is in an retracted position and at least partially expose the one or more window ports when the nozzle is in an extended position.

20. A method for operating a nozzle to enable fluid dispensation, the method comprising:
 inserting the nozzle into a receptacle, wherein the nozzle includes a main body and a probe slidably disposed in the main body, wherein the probe includes a probe body that defines a check void and a check assembly that is at least partially disposed in the check void, wherein the check assembly includes a check configured to move relative to the main body and the probe body and a spring configured to bias the check to sealingly engage the probe body in a closed position; and
 pressing the check against a surface of the receptacle to cause the check to overcome the bias of the spring and move relative to the probe body to an open position, wherein pressure within a nozzle inner void of the nozzle is equalized with a receptacle inner void of the receptacle via the check void when the check is in the open position.

21. The method of claim 20, further comprising extending the nozzle into the receptacle and further extending the probe at least partially beyond the main body of the nozzle to an extended position, wherein transitioning the nozzle to the extended position fluidly connects outlet ports of the probe with the receptacle inner void of the receptacle, wherein the outlet ports are in constant fluid communication with the nozzle inner void.

22. The method of claim 21, further comprising causing fluid to be dispensed from the nozzle inner void of the nozzle and to the receptacle via the outlet ports when the nozzle is in the extended position.

23. The method of claim 21, wherein transitioning the nozzle to the extended position including translating the main body a first distance and translating the probe a second distance that exceeds the first distance, wherein the main body and the probe move together as a common unit until reaching the first distance, wherein the probe moves separately with respect to the main body after reaching the first distance.

24. The method of claim 23, further comprising positioning the nozzle in a retracted position to prevent fluid from being dispensed to the receptacle by fluidly disconnecting the nozzle inner void of the nozzle from the receptacle inner void of the receptacle, wherein positioning the nozzle in the retracted position includes retracting the nozzle within the main body to cause the main body to cover the outlet ports.

* * * * *